US012515230B2

(12) United States Patent
Maier et al.

(10) Patent No.: US 12,515,230 B2
(45) Date of Patent: Jan. 6, 2026

(54) PAINT GUN, MATERIAL APPLICATION SYSTEM, AND METHOD FOR OPERATING SAME

(71) Applicant: SATA GmbH & Co. KG, Kornwestheim (DE)

(72) Inventors: Norbert Maier, Allmersbach i.T. (DE); Jens Brose, Ottmarsheim (DE)

(73) Assignee: SATA GmbH & Co. KG, Kornwestheim (DE)

( * ) Notice: Subject to any disclaimer, the term of this patent is extended or adjusted under 35 U.S.C. 154(b) by 1050 days.

(21) Appl. No.: 17/274,710

(22) PCT Filed: Sep. 9, 2019

(86) PCT No.: PCT/EP2019/074000
§ 371 (c)(1),
(2) Date: Mar. 9, 2021

(87) PCT Pub. No.: WO2020/053153
PCT Pub. Date: Mar. 19, 2020

(65) Prior Publication Data

US 2022/0048054 A1 Feb. 17, 2022

(30) Foreign Application Priority Data

Sep. 10, 2018 (DE) ..................... 10 2018 122 004.9

(51) Int. Cl.
*B05B 7/08* (2006.01)
*B05B 12/00* (2018.01)
*B05B 15/63* (2018.01)

(52) U.S. Cl.
CPC .......... *B05B 7/0815* (2013.01); *B05B 12/008* (2013.01); *B05B 15/63* (2018.02)

(58) Field of Classification Search
CPC ..... B05B 7/0815; B05B 12/008; B05B 15/63; B05B 7/02; B05B 7/068; B05B 7/2478; B05B 12/004
See application file for complete search history.

(56) References Cited

U.S. PATENT DOCUMENTS

| | | | |
|---|---|---|---|
| 40,433 | A | 10/1863 | Sees |
| 327,260 | A | 9/1885 | Hart |

(Continued)

FOREIGN PATENT DOCUMENTS

| | | |
|---|---|---|
| AT | 153883 | 6/1997 |
| AT | 163577 | 3/1998 |

(Continued)

OTHER PUBLICATIONS

Examination Search report dated Aug. 26, 2025 for Canadian Application No. 3,109,825.

(Continued)

*Primary Examiner* — Qingzhang Zhou
(74) *Attorney, Agent, or Firm* — Fleit Intellectual Property Law; Paul D. Bianco

(57) ABSTRACT

A paint gun for atomizing (in particular by way of compressed-air-assisted atomization) and applying a coating material such as a paint has a material-guiding part, a non-material-guiding part, and a transmitting and/or receiving device for wireless signal transmission. In order to increase the functional reliability and provide optimal operability in the environment in which the coating material is applied, the transmitting and/or receiving device for wireless signal transmission is arranged at a distance from the material-guiding part and is associated with the non-material-guiding part. Alternatively or additionally, an increased functional reliability is achieved by designing the transmitting and/or receiving device for wireless signal transmission in accordance with two different radio standards. Further- (Continued)

more, a material application system comprising such a paint gun as well as a method for operating same are described.

15 Claims, 2 Drawing Sheets

(56) References Cited

U.S. PATENT DOCUMENTS

| | | | |
|---|---|---|---|
| 459,432 | A | 9/1891 | Anderson |
| 459,433 | A | 9/1891 | Avery |
| 548,816 | A | 10/1895 | Paul |
| 552,213 | A | 12/1895 | Troy |
| 552,715 | A | 1/1896 | Lugrin |
| 563,505 | A | 7/1896 | McCornack |
| 574,880 | A | 1/1897 | Collison |
| 581,107 | A | 4/1897 | Emery |
| 644,803 | A | 3/1900 | Justi |
| 672,012 | A | 4/1901 | Ruper |
| 1,610,190 | A | 12/1926 | Anderson |
| 1,662,496 | A | 3/1928 | Forsgard |
| 1,703,383 | A | 2/1929 | Birkenmaier |
| 1,703,384 | A | 2/1929 | Birkenmaier |
| 1,711,221 | A | 4/1929 | Blakeslee |
| 1,751,787 | A | 3/1930 | Binks |
| 1,889,201 | A | 11/1932 | Holveck |
| 1,958,730 | A | 5/1934 | Tracy |
| 2,004,303 | A | 6/1935 | Wahlin |
| 2,008,381 | A | 7/1935 | Beeg |
| D99,473 | S | 4/1936 | Bramsen |
| 2,049,700 | A | 8/1936 | Gustafson |
| 2,051,210 | A | 8/1936 | Gustafsson |
| 2,070,696 | A | 2/1937 | Tracy |
| 2,116,036 | A | 5/1938 | Money |
| 2,125,445 | A | 8/1938 | Holveck |
| 2,198,441 | A | 4/1940 | Mollart |
| 2,204,599 | A | 6/1940 | Jenkins |
| 2,269,057 | A | 1/1942 | Jenkins |
| D133,223 | S | 7/1942 | Tammen |
| 2,356,865 | A | 8/1944 | Mason |
| 2,416,856 | A | 3/1947 | Thomsen |
| 2,416,923 | A | 3/1947 | Jenkins |
| 2,470,718 | A | 5/1949 | Peeps |
| 2,533,953 | A | 12/1950 | Peeps |
| 2,557,593 | A | 6/1951 | Bjorkman |
| 2,557,606 | A | 6/1951 | Liedberg |
| 2,559,091 | A | 7/1951 | Reasenberg |
| 2,578,402 | A | 12/1951 | Dalrymple |
| 2,609,961 | A | 9/1952 | Sapien |
| 2,612,899 | A | 10/1952 | Earle |
| 2,626,188 | A | 1/1953 | Dalrymple |
| 2,646,314 | A | 7/1953 | Peeps |
| 2,721,004 | A | 10/1955 | Schultz |
| 2,743,963 | A | 5/1956 | Peeps |
| 2,844,267 | A | 7/1958 | Petriccione |
| 2,886,252 | A | 5/1959 | Ehrensperger |
| 3,090,530 | A | 5/1963 | Peeps |
| D196,477 | S | 10/1963 | Kelly |
| 3,159,472 | A | 12/1964 | Revell |
| D200,594 | S | 3/1965 | Sass |
| 3,240,398 | A | 3/1966 | Dalton, Jr. |
| D204,306 | S | 4/1966 | Hamm |
| D205,760 | S | 9/1966 | Hocutt et al. |
| 3,327,949 | A | 6/1967 | Eull |
| D208,903 | S | 10/1967 | Zadron et al. |
| 3,344,992 | A | 10/1967 | Norris |
| D209,792 | S | 1/1968 | Clark |
| 3,381,845 | A | 5/1968 | MacDonald |
| 3,417,650 | A | 12/1968 | Varrin |
| 3,420,106 | A | 1/1969 | Keller et al. |
| 3,435,683 | A | 4/1969 | Keller et al. |
| 3,463,363 | A | 8/1969 | Zelna |
| 3,482,781 | A | 12/1969 | Sharpe |
| D217,928 | S | 6/1970 | Falske |
| 3,524,589 | A | 8/1970 | Pelton, Jr. |
| 3,527,372 | A | 9/1970 | Manning |
| 3,583,632 | A | 6/1971 | Shaffer |
| 3,622,078 | A | 11/1971 | Gronert |
| 3,645,562 | A | 2/1972 | Fandetti et al. |
| 3,656,493 | A | 4/1972 | Black et al. |
| 3,714,967 | A | 2/1973 | Zupan et al. |
| 3,746,253 | A | 7/1973 | Walberg |
| 3,747,850 | A | 7/1973 | Hastings et al. |
| 3,771,539 | A | 11/1973 | De Santis |
| 3,840,143 | A | 10/1974 | Davis et al. |
| 3,848,807 | A | 11/1974 | Partida |
| 3,857,511 | A | 12/1974 | Govindan |
| 3,870,223 | A | 3/1975 | Wyant |
| 3,873,023 | A | 3/1975 | Moss et al. |
| 3,938,739 | A | 2/1976 | Bertilsson et al. |
| 4,000,915 | A | 1/1977 | Strom |
| D245,048 | S | 7/1977 | Pool |
| 4,105,164 | A | 8/1978 | Lau |
| D252,097 | S | 6/1979 | Probst et al. |
| 4,160,525 | A | 7/1979 | Wagner |
| 4,162,042 | A | 7/1979 | Mommsen |
| 4,171,091 | A | 10/1979 | van Hardeveld et al. |
| 4,210,263 | A | 7/1980 | Bos |
| 4,273,293 | A | 6/1981 | Hastings |
| 4,278,276 | A | 7/1981 | Ekman |
| 4,411,387 | A | 10/1983 | Stern et al. |
| 4,478,370 | A | 10/1984 | Hastings |
| D276,472 | S | 11/1984 | Harrison |
| D278,543 | S | 4/1985 | Gintz |
| 4,545,536 | A | 10/1985 | Avidon |
| 4,562,965 | A | 1/1986 | Ihmels et al. |
| 4,572,437 | A | 2/1986 | Huber et al. |
| 4,580,035 | A | 4/1986 | Luscher |
| 4,585,468 | A | 4/1986 | Even et al. |
| 4,614,300 | A | 9/1986 | Falcoff |
| 4,643,330 | A | 2/1987 | Kennedy |
| 4,653,661 | A | 3/1987 | Buchner et al. |
| 4,667,878 | A | 5/1987 | Behr |
| 4,713,257 | A | 12/1987 | Luftermoeller |
| D293,950 | S | 1/1988 | Ogden et al. |
| 4,730,753 | A | 3/1988 | Grime |
| 4,767,057 | A | 8/1988 | Degli |
| D298,372 | S | 11/1988 | Taylor, Jr. |
| 4,784,184 | A | 11/1988 | Gates |
| 4,806,736 | A | 2/1989 | Schirico |
| 4,826,539 | A | 5/1989 | Harpold |
| 4,832,232 | A | 5/1989 | Broccoli |
| 4,844,347 | A | 7/1989 | Konhauser |
| 4,854,504 | A | 8/1989 | Hedger, Jr. et al. |
| 4,863,781 | A | 9/1989 | Kronzer |
| 4,877,144 | A | 10/1989 | Thanisch |
| D305,057 | S | 12/1989 | Morgan |
| 4,887,747 | A | 12/1989 | Ostrowsky et al. |
| 4,901,761 | A | 2/1990 | Taylor |
| 4,906,151 | A | 3/1990 | Kubis |
| 4,917,300 | A | 4/1990 | Gloviak et al. |
| 4,946,075 | A | 8/1990 | Lundback |
| 4,964,361 | A | 10/1990 | Aebersold |
| 4,967,600 | A | 11/1990 | Keller |
| 4,969,603 | A | 11/1990 | Norman |
| 4,973,184 | A | 11/1990 | La Salle |
| D313,064 | S | 12/1990 | Lind |
| D314,421 | S | 2/1991 | Tajima et al. |
| D314,588 | S | 2/1991 | Denham |
| 4,989,787 | A | 2/1991 | Nikkel et al. |
| 5,020,700 | A | 6/1991 | Krzywdziak et al. |
| D318,877 | S | 8/1991 | Miranda et al. |
| 5,042,840 | A | 8/1991 | Rieple et al. |
| D321,597 | S | 11/1991 | Cerny |
| 5,064,119 | A | 11/1991 | Mellette |
| 5,071,074 | A | 12/1991 | Lind |
| 5,074,334 | A | 12/1991 | Onodera |
| 5,078,323 | A | 1/1992 | Frank |
| 5,078,325 | A | 1/1992 | Waryu |
| 5,080,285 | A | 1/1992 | Toth |
| 5,088,648 | A | 2/1992 | Schmon |
| 5,090,623 | A | 2/1992 | Burns et al. |
| 5,102,045 | A | 4/1992 | Diana |
| 5,119,992 | A | 6/1992 | Grime |
| 5,125,391 | A | 6/1992 | Srivastava et al. |

(56) References Cited

U.S. PATENT DOCUMENTS

| | | | |
|---|---|---|---|
| 5,135,124 | A | 8/1992 | Wobser |
| 5,143,102 | A | 9/1992 | Blaut |
| 5,165,605 | A | 11/1992 | Morita et al. |
| 5,170,941 | A | 12/1992 | Morita et al. |
| 5,190,219 | A | 3/1993 | Copp, Jr. |
| 5,191,797 | A | 3/1993 | Smith |
| 5,209,405 | A | 5/1993 | Robinson et al. |
| 5,228,488 | A | 7/1993 | Fletcher |
| 5,232,299 | A | 8/1993 | Hiss |
| 5,236,128 | A | 8/1993 | Morita et al. |
| 5,249,746 | A | 10/1993 | Kaneko et al. |
| D341,186 | S | 11/1993 | Albers |
| 5,289,974 | A | 3/1994 | Grime et al. |
| 5,322,221 | A | 6/1994 | Anderson |
| 5,325,473 | A | 6/1994 | Monroe et al. |
| 5,332,156 | A | 7/1994 | Wheeler |
| 5,333,506 | A | 8/1994 | Smith et al. |
| 5,333,908 | A | 8/1994 | Dorney et al. |
| 5,344,078 | A | 9/1994 | Fritz et al. |
| 5,367,148 | A | 11/1994 | Storch et al. |
| D353,836 | S | 12/1994 | Carvelli et al. |
| 5,381,962 | A | 1/1995 | Teague |
| 5,435,491 | A | 7/1995 | Sakuma |
| 5,443,642 | A | 8/1995 | Bienduga |
| 5,456,414 | A | 10/1995 | Burns et al. |
| D365,952 | S | 1/1996 | Gagnon et al. |
| 5,503,439 | A | 4/1996 | LaJeunesse et al. |
| 5,529,245 | A | 6/1996 | Brown |
| 5,533,674 | A | 7/1996 | Feyrer et al. |
| 5,540,385 | A | 7/1996 | Garlick |
| 5,540,386 | A | 7/1996 | Roman |
| D376,637 | S | 12/1996 | Kieffer |
| 5,582,350 | A | 12/1996 | Kosmyna et al. |
| 5,584,899 | A | 12/1996 | Shorts |
| 5,588,562 | A | 12/1996 | Sander et al. |
| 5,592,597 | A | 1/1997 | Kiss |
| 5,609,302 | A | 3/1997 | Smith |
| 5,613,637 | A | 3/1997 | Schmon |
| D380,301 | S | 7/1997 | Kogutt |
| 5,655,714 | A | 8/1997 | Kieffer et al. |
| 5,662,444 | A | 9/1997 | Schmidt, Jr. |
| 5,667,143 | A | 9/1997 | Sebion et al. |
| 5,695,125 | A | 12/1997 | Kumar |
| 5,704,381 | A | 1/1998 | Millan et al. |
| 5,718,767 | A | 2/1998 | Crum et al. |
| D391,403 | S | 3/1998 | Josephs |
| 5,725,161 | A | 3/1998 | Hartle |
| RE35,769 | E | 4/1998 | Grime et al. |
| 5,755,363 | A | 5/1998 | Gantner et al. |
| 5,762,228 | A | 6/1998 | Morgan et al. |
| 5,803,360 | A | 9/1998 | Spitznagel |
| 5,816,501 | A | 10/1998 | LoPresti et al. |
| 5,829,682 | A | 11/1998 | Haruch |
| 5,836,517 | A | 11/1998 | Burns et al. |
| D402,820 | S | 12/1998 | Morison et al. |
| 5,843,515 | A | 12/1998 | Crum et al. |
| 5,853,014 | A | 12/1998 | Rosenauer |
| D405,503 | S | 2/1999 | Endo |
| 5,874,680 | A | 2/1999 | Moore |
| 5,884,006 | A | 3/1999 | Frohlich et al. |
| D409,719 | S | 5/1999 | Kaneko |
| D412,965 | S | 8/1999 | Kieffer |
| 5,941,461 | A | 8/1999 | Akin et al. |
| 5,951,190 | A | 9/1999 | Wilson |
| 5,951,296 | A | 9/1999 | Klein |
| 5,954,268 | A | 9/1999 | Joshi et al. |
| D414,636 | S | 10/1999 | Wiese |
| 5,979,797 | A | 11/1999 | Castellano |
| 5,992,763 | A | 11/1999 | Smith et al. |
| 6,006,930 | A | 12/1999 | Dreyer et al. |
| 6,010,082 | A | 1/2000 | Peterson |
| 6,017,394 | A | 1/2000 | Crum et al. |
| 6,019,294 | A | 2/2000 | Anderson |
| 6,036,109 | A | 3/2000 | DeYoung |
| 6,039,218 | A | 3/2000 | Beck |
| 6,050,499 | A | 4/2000 | Takayama |
| 6,053,429 | A | 4/2000 | Chang |
| 6,056,213 | A | 5/2000 | Ruta et al. |
| 6,056,215 | A | 5/2000 | Hansinger |
| 6,089,471 | A | 7/2000 | Scholl |
| 6,089,607 | A | 7/2000 | Keeney et al. |
| 6,091,053 | A | 7/2000 | Aonuma |
| 6,092,740 | A | 7/2000 | Liu |
| 6,105,881 | A | 8/2000 | Kitajima |
| 6,132,511 | A | 10/2000 | Crum et al. |
| D435,379 | S | 12/2000 | Nguyen |
| 6,230,986 | B1 | 5/2001 | Vacher et al. |
| 6,250,567 | B1 | 6/2001 | Lewis et al. |
| 6,267,301 | B1 | 7/2001 | Haruch |
| 6,276,616 | B1 | 8/2001 | Jenkins |
| D448,451 | S | 9/2001 | Turnbull et al. |
| 6,308,991 | B1 | 10/2001 | Royer |
| D457,599 | S | 5/2002 | Karwoski et al. |
| D459,432 | S | 6/2002 | Schmon |
| D459,433 | S | 6/2002 | Schmon |
| 6,402,058 | B2 | 6/2002 | Kaneko et al. |
| 6,402,062 | B1 | 6/2002 | Bendig et al. |
| 6,431,466 | B1 | 8/2002 | Kitajima |
| 6,435,426 | B1 | 8/2002 | Copp, Jr. |
| 6,442,276 | B1 | 8/2002 | Doljack |
| 6,450,422 | B1 | 9/2002 | Maggio |
| 6,494,387 | B1 | 12/2002 | Kaneko |
| 6,536,684 | B1 | 3/2003 | Wei |
| 6,536,687 | B1 | 3/2003 | Navis et al. |
| D472,730 | S | 4/2003 | Sparkowski |
| 6,540,114 | B1 | 4/2003 | Popovich et al. |
| 6,543,632 | B1 | 4/2003 | McIntyre et al. |
| 6,547,160 | B1 | 4/2003 | Huang |
| 6,547,884 | B1 | 4/2003 | Crum et al. |
| 6,553,712 | B1 | 4/2003 | Majerowski et al. |
| 6,554,009 | B1 | 4/2003 | Beijbom et al. |
| D474,528 | S | 5/2003 | Huang |
| 6,585,173 | B2 | 7/2003 | Schmon et al. |
| 6,595,441 | B2 | 7/2003 | Petrie et al. |
| 6,612,506 | B1 | 9/2003 | Huang |
| 6,626,382 | B1 | 9/2003 | Liu |
| 6,626,383 | B1 | 9/2003 | Campbell |
| 6,647,997 | B2 | 11/2003 | Mohn |
| 6,661,438 | B1 | 12/2003 | Shiraishi et al. |
| D485,685 | S | 1/2004 | Zupkofska et al. |
| 6,675,845 | B2 | 1/2004 | Volpenheim et al. |
| 6,692,118 | B2 | 2/2004 | Michele et al. |
| 6,712,292 | B1 | 3/2004 | Gosis et al. |
| 6,717,584 | B2 | 4/2004 | Kulczycka |
| 6,732,751 | B2 | 5/2004 | Chiang |
| 6,763,964 | B1 | 7/2004 | Hurlbut et al. |
| 6,766,763 | B2 | 7/2004 | Crum et al. |
| 6,786,345 | B2 | 9/2004 | Richards |
| 6,796,514 | B1 | 9/2004 | Schwartz |
| 6,801,211 | B2 | 10/2004 | Forsline et al. |
| 6,820,824 | B1 | 11/2004 | Joseph et al. |
| 6,843,390 | B1 | 1/2005 | Bristor |
| 6,845,924 | B2 | 1/2005 | Schmon |
| 6,855,173 | B2 | 2/2005 | Ehrnsperger et al. |
| 6,863,310 | B1 | 3/2005 | Petkovsek |
| 6,863,920 | B2 | 3/2005 | Crum et al. |
| 6,874,656 | B2 | 4/2005 | Rohr et al. |
| 6,874,664 | B1 | 4/2005 | Montgomery |
| 6,874,708 | B2 | 4/2005 | Reetz, III |
| 6,877,677 | B2 | 4/2005 | Schmon et al. |
| 6,929,019 | B2 | 8/2005 | Weinmann et al. |
| 6,945,429 | B2 | 9/2005 | Gosis et al. |
| 6,955,180 | B2 | 10/2005 | Kocherlakota et al. |
| 6,962,432 | B2 | 11/2005 | Hofeldt |
| 6,963,331 | B1 | 11/2005 | Kobayashi et al. |
| 7,017,838 | B2 | 3/2006 | Schmon |
| 7,018,154 | B2 | 3/2006 | Schmon |
| D519,687 | S | 4/2006 | Zahav |
| 7,032,839 | B2 | 4/2006 | Biette |
| 7,036,752 | B1 | 5/2006 | Hsiang |
| 7,083,119 | B2 | 8/2006 | Bouic et al. |
| 7,090,148 | B2 | 8/2006 | Petrie et al. |
| 7,097,118 | B1 | 8/2006 | Huang |
| D528,192 | S | 9/2006 | Nicholson |

(56) References Cited

U.S. PATENT DOCUMENTS 7,106,343 B1 9/2006 Hickman
7,165,732 B2 1/2007 Kosmyna et al.
7,172,139 B2 2/2007 Bouic et al.
7,175,110 B2 2/2007 Vicentini
7,182,213 B2 2/2007 King
D538,050 S 3/2007 Tardif
D538,493 S 3/2007 Zimmerle et al.
D538,886 S 3/2007 Huang
7,194,829 B2 3/2007 Boire et al.
D541,053 S 4/2007 Sanders
D541,088 S 4/2007 Nesci
7,201,336 B2 4/2007 Blette et al.
7,216,813 B2 5/2007 Rogers
D545,943 S 7/2007 Rodgers et al.
7,246,713 B2 7/2007 King
7,249,519 B2 7/2007 Rogers
D548,816 S 8/2007 Schmon
7,255,293 B2 8/2007 Dodd
7,264,131 B2 9/2007 Tsutsumi et al.
D552,213 S 10/2007 Schmon
D552,715 S 10/2007 Schmon
D554,703 S 11/2007 Josephson
7,328,855 B2 2/2008 Chatron et al.
D563,505 S 3/2008 Schmon
7,374,111 B2 5/2008 Joseph et al.
D570,448 S 6/2008 Wang
D571,463 S 6/2008 Chesnin
7,384,004 B2 6/2008 Rogers
7,389,945 B2 6/2008 Huang
RE40,433 E 7/2008 Schmon
D573,227 S 7/2008 Mirazita et al.
D574,926 S 8/2008 Huang
D574,927 S 8/2008 Larsen
D575,374 S 8/2008 Huang
7,410,106 B2 8/2008 Escoto, Jr. et al.
7,416,140 B2 8/2008 Camilleri et al.
7,422,164 B2 9/2008 Matsumoto
D579,213 S 10/2008 Aipa
D581,107 S 11/2008 Schmon
D581,483 S 11/2008 Bass et al.
D583,013 S 12/2008 Wang
7,458,612 B1 12/2008 Bennett
7,472,840 B2 1/2009 Gregory
D588,231 S 3/2009 Pellin
7,533,678 B2 5/2009 Rosa
7,540,434 B2 6/2009 Gohring et al.
7,542,032 B2 6/2009 Kruse
7,568,638 B2 8/2009 Gehrung
D604,394 S 11/2009 Wang
7,614,571 B2 11/2009 Camilleri et al.
D607,086 S 12/2009 Kosaka
7,624,869 B2 12/2009 Primer
D607,972 S 1/2010 Wang
D608,858 S 1/2010 Baltz et al.
D613,820 S 4/2010 Chou
D614,731 S 4/2010 Wang
7,694,893 B2 4/2010 Zittel et al.
7,694,896 B2 4/2010 Turnbull et al.
D615,586 S 5/2010 Kudimi
D616,022 S 5/2010 Kudimi
D616,527 S 5/2010 Anderson et al.
7,765,876 B1 8/2010 Chen
D624,668 S 9/2010 Noppe
7,810,744 B2 10/2010 Schmon et al.
7,819,341 B2 10/2010 Schmon et al.
D627,039 S 11/2010 Yu
D627,432 S 11/2010 Escoto et al.
7,823,806 B2 11/2010 Schmon
D629,623 S 12/2010 Lampe
7,856,940 B2 12/2010 Wendler
7,913,938 B2 3/2011 Cooper
7,922,107 B2 4/2011 Fox
D637,269 S 5/2011 Wang
D638,121 S 5/2011 Villasana
D639,863 S 6/2011 Langan
D641,067 S 7/2011 Wang
D644,716 S 9/2011 Gehrung
D644,803 S 9/2011 Schmon
D645,094 S 9/2011 Langan
8,042,402 B2 10/2011 Brown et al.
D649,196 S 11/2011 Langan
8,052,071 B2 11/2011 Kruse
D655,347 S 3/2012 Gehrung
8,127,963 B2 3/2012 Gerson et al.
D657,276 S 4/2012 Brose
D661,492 S 6/2012 Ranschau
D661,742 S 6/2012 Clark
D663,960 S 7/2012 Jeronimo
8,225,892 B2 7/2012 Ben-Tzvi
D664,773 S 8/2012 Papin
8,240,579 B1 8/2012 Bennett
8,297,536 B2 10/2012 Ruda
D670,085 S 11/2012 Brookman et al.
8,308,086 B2 11/2012 Micheli
D671,988 S 12/2012 Leipold
D672,012 S 12/2012 Brose
D674,880 S 1/2013 Schmon
8,352,744 B2 1/2013 Kruse
8,360,345 B2 1/2013 Micheli
D681,162 S 4/2013 Kruse
8,444,067 B2 5/2013 Schmon et al.
8,454,759 B2 6/2013 Solsvik
8,481,124 B2 7/2013 Nolte et al.
D689,590 S 9/2013 Brose
D689,593 S 9/2013 Schmon
D690,799 S 10/2013 Maier
D692,530 S 10/2013 Gehrung
D692,532 S 10/2013 Li et al.
8,616,434 B2 12/2013 Wilen
D697,584 S 1/2014 Schmon
D698,008 S 1/2014 Schmon et al.
8,626,674 B2 1/2014 Whitehouse
8,642,131 B2 2/2014 Nolle et al.
D703,293 S 4/2014 Price
8,690,083 B2 4/2014 Drozd
D704,300 S 5/2014 Li et al.
8,757,182 B2 6/2014 Schmon
8,807,460 B2 8/2014 Charpie et al.
8,857,732 B2 10/2014 Brose
8,870,097 B2 10/2014 Micheli
D720,015 S 12/2014 Kruse
D720,041 S 12/2014 Robinson
8,899,501 B2 12/2014 Fox et al.
D721,785 S 1/2015 Gehrung
8,925,836 B2 1/2015 Dettiaff
D726,982 S 4/2015 Campelli
D733,369 S 6/2015 Tschan
D733,453 S 7/2015 Tschan
D734,428 S 7/2015 Wang
D734,429 S 7/2015 Wang
D734,571 S 7/2015 Tschan
9,073,068 B2 7/2015 Krayer et al.
D737,126 S 8/2015 Tschan
D740,393 S 10/2015 Gehrung
D745,636 S 12/2015 Lin
9,220,853 B2 12/2015 Vogt
D757,216 S 5/2016 Gehrung
9,333,519 B2 5/2016 Brose
D758,533 S 6/2016 Dettlaff
D758,537 S 6/2016 Gehrung et al.
9,433,953 B2 9/2016 Ghesla et al.
D768,820 S 10/2016 Binz
D770,593 S 11/2016 Gehrung
9,498,788 B2 11/2016 Kosaka
9,533,317 B2 1/2017 Gehrung
D792,557 S 7/2017 Wang
D794,756 S 8/2017 Wang
9,782,784 B2 10/2017 Schmon et al.
D803,354 S 11/2017 Negri
9,878,336 B2 1/2018 Gehrung
9,878,340 B2 1/2018 Schmon et al.
D812,719 S 3/2018 Kosaka
D820,389 S 6/2018 Gehrung
D830,506 S 10/2018 Gehrung

(56) References Cited

U.S. PATENT DOCUMENTS

| | | | |
|---|---|---|---|
| D831,792 S | 10/2018 | Gehrung | |
| D835,235 S | 12/2018 | Gehrung et al. | |
| 10,189,037 B2 | 1/2019 | Schmon et al. | |
| 10,247,313 B2 | 4/2019 | Chien | |
| 10,464,076 B2 | 11/2019 | Sata | |
| 10,471,449 B2 | 11/2019 | Gehrung | |
| D877,294 S | 3/2020 | Johnston | |
| 10,702,879 B2 | 7/2020 | Gehrung | |
| 10,940,498 B2 | 3/2021 | Fideler | |
| D927,645 S | 8/2021 | Davies | |
| D929,838 S | 9/2021 | Tschan | |
| D934,383 S | 10/2021 | Stech | |
| 11,141,747 B2 | 10/2021 | Schmon | |
| D968,568 S | 11/2022 | Shih | |
| 11,865,558 B2 | 1/2024 | Volk | |
| 2001/0004996 A1 | 6/2001 | Schmon | |
| 2001/0040192 A1 | 11/2001 | Kaneko et al. | |
| 2002/0092928 A1 | 7/2002 | Conroy | |
| 2002/0134861 A1 | 9/2002 | Petrie et al. | |
| 2002/0148501 A1 | 10/2002 | Shish | |
| 2002/0170978 A1 | 11/2002 | Mohn | |
| 2003/0006322 A1 | 1/2003 | Hartle et al. | |
| 2003/0025000 A1 | 2/2003 | Schmon | |
| 2003/0066218 A1 | 4/2003 | Schweikert | |
| 2003/0121476 A1 | 7/2003 | Mcintyre et al. | |
| 2003/0127046 A1 | 7/2003 | Zehner et al. | |
| 2003/0164408 A1 | 9/2003 | Schmon | |
| 2003/0173419 A1 | 9/2003 | Huang | |
| 2003/0177979 A1 | 9/2003 | Crum et al. | |
| 2003/0189105 A1 | 10/2003 | Schmon | |
| 2003/0209568 A1 | 11/2003 | Douglas et al. | |
| 2003/0213857 A1 | 11/2003 | Schmon et al. | |
| 2003/0218596 A1 | 11/2003 | Eschler | |
| 2003/0230636 A1 | 12/2003 | Rogers | |
| 2004/0046051 A1 | 3/2004 | Santa Cruz et al. | |
| 2004/0050432 A1 | 3/2004 | Breda | |
| 2004/0104194 A1 | 6/2004 | Dennison | |
| 2004/0129738 A1 | 7/2004 | Stukas | |
| 2004/0140373 A1 | 7/2004 | Joseph et al. | |
| 2004/0155063 A1 | 8/2004 | Hofeldt | |
| 2004/0159720 A1 | 8/2004 | Komornicki | |
| 2004/0177890 A1 | 9/2004 | Weinmann | |
| 2004/0191406 A1 | 9/2004 | Crum et al. | |
| 2004/0195382 A1* | 10/2004 | Anderson | B05B 12/00 239/525 |
| 2004/0217201 A1 | 11/2004 | Ruda | |
| 2004/0233223 A1 | 11/2004 | Schkolne et al. | |
| 2004/0245208 A1 | 12/2004 | Dennison | |
| 2005/0001060 A1 | 1/2005 | Robinson | |
| 2005/0056613 A1 | 3/2005 | King | |
| 2005/0082249 A1 | 4/2005 | King | |
| 2005/0127201 A1 | 6/2005 | Matsumoto | |
| 2005/0145723 A1 | 7/2005 | Blette et al. | |
| 2005/0145724 A1 | 7/2005 | Blette et al. | |
| 2005/0161525 A1 | 7/2005 | Johansson | |
| 2005/0178854 A1 | 8/2005 | Dodd | |
| 2005/0189445 A1 | 9/2005 | Hartle et al. | |
| 2005/0215284 A1 | 9/2005 | Su | |
| 2005/0218246 A1 | 10/2005 | Chatron | |
| 2005/0220943 A1 | 10/2005 | Abrams et al. | |
| 2005/0242207 A1 | 11/2005 | Tejeda | |
| 2005/0248148 A1 | 11/2005 | Schenck et al. | |
| 2005/0252993 A1 | 11/2005 | Rogers | |
| 2005/0252994 A1 | 11/2005 | Rogers | |
| 2005/0268949 A1 | 12/2005 | Rosa | |
| 2005/0284963 A1 | 12/2005 | Reedy | |
| 2006/0000927 A1 | 1/2006 | Ruda | |
| 2006/0007123 A1 | 1/2006 | Wilson et al. | |
| 2006/0048803 A1 | 3/2006 | Jessup et al. | |
| 2006/0081060 A1 | 4/2006 | Forster | |
| 2006/0108449 A1 | 5/2006 | Sodemann | |
| 2006/0113409 A1 | 6/2006 | Camilleri et al. | |
| 2006/0118661 A1 | 6/2006 | Hartle | |
| 2006/0131151 A1 | 6/2006 | Marchand | |
| 2006/0171771 A1 | 8/2006 | Kruse | |
| 2006/0192377 A1 | 8/2006 | Bauer et al. | |
| 2006/0196891 A1 | 9/2006 | Gerson et al. | |
| 2007/0029788 A1 | 2/2007 | Adler | |
| 2007/0055883 A1 | 3/2007 | Kruse | |
| 2007/0131795 A1 | 6/2007 | Abbate et al. | |
| 2007/0158349 A1 | 7/2007 | Schmon et al. | |
| 2007/0205305 A1 | 9/2007 | Vagedes | |
| 2007/0221754 A1 | 9/2007 | Gehrung | |
| 2007/0228190 A1 | 10/2007 | Tanner | |
| 2007/0252378 A1 | 11/2007 | Chambers | |
| 2007/0262169 A1 | 11/2007 | Wang | |
| 2007/0262172 A1 | 11/2007 | Huffman | |
| 2008/0011879 A1 | 1/2008 | Gerson et al. | |
| 2008/0019789 A1 | 1/2008 | Dunaway et al. | |
| 2008/0029619 A1 | 2/2008 | Gohring et al. | |
| 2008/0128533 A1 | 6/2008 | Gehrung | |
| 2008/0179763 A1 | 7/2008 | Schmon et al. | |
| 2008/0251607 A1 | 10/2008 | Krayer | |
| 2008/0251977 A1 | 10/2008 | Naruse et al. | |
| 2008/0264892 A1 | 10/2008 | Nozawa | |
| 2008/0272213 A1 | 11/2008 | Ting | |
| 2008/0296410 A1 | 12/2008 | Carey et al. | |
| 2009/0014557 A1 | 1/2009 | Schmon et al. | |
| 2009/0026288 A1 | 1/2009 | Shih | |
| 2009/0026290 A1 | 1/2009 | Fox | |
| 2009/0045623 A1 | 2/2009 | Schmon | |
| 2009/0072050 A1 | 3/2009 | Ruda | |
| 2009/0078789 A1 | 3/2009 | Kruse | |
| 2009/0078790 A1 | 3/2009 | Camilleri et al. | |
| 2009/0143745 A1 | 6/2009 | Langan et al. | |
| 2009/0152382 A1 | 6/2009 | Charpie | |
| 2009/0179081 A1 | 7/2009 | Charpie | |
| 2009/0183516 A1 | 7/2009 | Appler et al. | |
| 2009/0235864 A1 | 9/2009 | Khoury et al. | |
| 2009/0266915 A1 | 10/2009 | Fedorov | |
| 2009/0302133 A1 | 12/2009 | Micheli | |
| 2010/0021646 A1 | 1/2010 | Nolte | |
| 2010/0059533 A1 | 3/2010 | Unger et al. | |
| 2010/0084493 A1 | 4/2010 | Troudt | |
| 2010/0108783 A1 | 5/2010 | Joseph et al. | |
| 2010/0126541 A1 | 5/2010 | Schmon | |
| 2010/0163649 A1 | 7/2010 | Bass et al. | |
| 2010/0189887 A1* | 7/2010 | Nielsen | G01C 15/06 427/136 |
| 2010/0206963 A1 | 8/2010 | Huang | |
| 2010/0270390 A1 | 10/2010 | Reitz | |
| 2010/0270400 A1 | 10/2010 | Evar et al. | |
| 2011/0024524 A1 | 2/2011 | Fox | |
| 2011/0121103 A1 | 5/2011 | Carleton et al. | |
| 2011/0125607 A1 | 5/2011 | Wilen | |
| 2011/0127767 A1 | 6/2011 | Wicks et al. | |
| 2011/0168811 A1 | 7/2011 | Fox et al. | |
| 2011/0174901 A1 | 7/2011 | Dettlaff et al. | |
| 2012/0012671 A1 | 1/2012 | Brose et al. | |
| 2012/0097762 A1 | 4/2012 | Gehrung et al. | |
| 2012/0097765 A1 | 4/2012 | Drozd | |
| 2012/0132550 A1 | 5/2012 | Gerson et al. | |
| 2012/0160935 A1 | 6/2012 | Krayer et al. | |
| 2012/0187220 A1 | 7/2012 | Micheli et al. | |
| 2013/0056556 A1 | 3/2013 | Schmon et al. | |
| 2013/0074864 A1 | 3/2013 | Nuzzo et al. | |
| 2013/0092760 A1 | 4/2013 | Joseph | |
| 2013/0266734 A1 | 10/2013 | Nolte et al. | |
| 2013/0320110 A1 | 12/2013 | Brose et al. | |
| 2013/0327850 A1 | 12/2013 | Joseph | |
| 2014/0034757 A1 | 2/2014 | Kaneko | |
| 2014/0048627 A1 | 2/2014 | Schmon et al. | |
| 2014/0059905 A1 | 3/2014 | Raming | |
| 2014/0145003 A1 | 5/2014 | Schmon et al. | |
| 2014/0263686 A1 | 9/2014 | Hedger | |
| 2014/0305962 A1 | 10/2014 | Tachan | |
| 2014/0339322 A1 | 11/2014 | Freers | |
| 2014/0346257 A1 | 11/2014 | Reetz, III et al. | |
| 2015/0108254 A1 | 4/2015 | Commette | |
| 2015/0165463 A1 | 6/2015 | Gehrung | |
| 2015/0231655 A1 | 8/2015 | Adams et al. | |
| 2016/0030960 A1 | 2/2016 | Gehrung | |
| 2016/0243567 A1 | 8/2016 | Brose | |
| 2017/0252771 A1 | 9/2017 | Young | |

(56) References Cited

U.S. PATENT DOCUMENTS

| | | | | |
|---|---|---|---|---|
| 2017/0304852 | A1 | 10/2017 | Bierie | |
| 2018/0050355 | A1 | 2/2018 | Delsard | |
| 2018/0050356 | A1 | 2/2018 | Gehrung | |
| 2018/0050358 | A1 | 2/2018 | Ruda | |
| 2018/0050361 | A1 | 2/2018 | Gehrung et al. | |
| 2018/0050362 | A1 | 2/2018 | Gehrung et al. | |
| 2018/0111142 | A1 | 4/2018 | Joaquim | |
| 2018/0133727 | A1 | 5/2018 | Schmon et al. | |
| 2018/0160670 | A1* | 6/2018 | Pellenc | B05B 3/105 |
| 2018/0200740 | A1 | 7/2018 | Rossbach et al. | |
| 2018/0236465 | A1 | 8/2018 | Krayer | |
| 2020/0038889 | A1 | 2/2020 | Volk | |
| 2020/0038892 | A1 | 2/2020 | Volk et al. | |
| 2021/0379612 | A1 | 12/2021 | Volk | |
| 2022/0080448 | A1 | 3/2022 | Volk | |
| 2023/0107860 | A1 | 4/2023 | Maier | |
| 2023/0149955 | A1 | 5/2023 | Maier | |

FOREIGN PATENT DOCUMENTS

| | | | |
|---|---|---|---|
| AT | 250467 | | 10/2003 |
| AT | 322645 | | 4/2006 |
| AT | 383910 | | 2/2008 |
| AT | 461752 | | 4/2010 |
| AT | 461753 | | 4/2010 |
| AT | 475488 | | 8/2010 |
| AU | 637187 | | 5/1993 |
| AU | 2002352235 | | 9/2003 |
| AU | 2004315547 | | 8/2005 |
| AU | 2005205899 | | 8/2005 |
| AU | 2011257605 | | 11/2012 |
| AU | 2011361295 | | 5/2013 |
| CA | 521511 | | 2/1956 |
| CA | 2126957 | | 1/1995 |
| CA | 2277096 | | 7/1998 |
| CA | 2445183 | | 10/2002 |
| CA | 2552390 | | 8/2005 |
| CA | 2555607 | | 8/2005 |
| CA | 2690112 | | 5/2009 |
| CA | 2797990 | | 12/2011 |
| CA | 2812684 | | 9/2012 |
| CA | 102917803 | | 2/2013 |
| CA | 2850401 | A1 | 5/2013 |
| CH | 200754 | A | 10/1938 |
| CH | 203 668 | | 6/1939 |
| CH | 523098 | A | 5/1972 |
| CH | 542104 | A | 9/1973 |
| CH | 676208 | | 12/1990 |
| CN | 20136077 | Y | 6/1993 |
| CN | 1738310 | A | 2/2006 |
| CN | 1899704 | A | 1/2007 |
| CN | 1902002 | | 1/2007 |
| CN | 1909970 | | 2/2007 |
| CN | 1909971 | | 2/2007 |
| CN | 1917960 | | 2/2007 |
| CN | 200954482 | | 10/2007 |
| CN | 101125316 | | 2/2008 |
| CN | 201064746 | Y | 5/2008 |
| CN | 100430150 | | 11/2008 |
| CN | 100455360 | | 1/2009 |
| CN | 101367066 | | 2/2009 |
| CN | 100478080 | | 4/2009 |
| CN | 101516523 | A | 8/2009 |
| CN | 101646500 | | 2/2010 |
| CN | 102211070 | | 4/2011 |
| CN | 102139249 | A | 8/2011 |
| CN | 102211069 | | 10/2011 |
| CN | 202667052 | U | 1/2013 |
| CN | 103 521 378 | A | 1/2014 |
| CN | 203508251 | U | 4/2014 |
| CN | 203737474 | U | 7/2014 |
| CN | 204074345 | U | 1/2015 |
| CN | 204294401 | U | 4/2015 |
| CN | 105377447 | A | 3/2016 |
| CN | 205966208 | U | 2/2017 |
| CN | 107427851 | A | 12/2017 |
| CN | 107666966 | A | 2/2018 |
| CN | 108223901 | A | 6/2018 |
| CN | 207493903 | U | 6/2018 |
| CN | 108438227 | A | 8/2018 |
| DE | 259621 | C | 5/1913 |
| DE | 460381 | | 5/1928 |
| DE | 510362 | | 10/1930 |
| DE | 611325 | C | 3/1935 |
| DE | 1425890 | | 11/1968 |
| DE | 2559036 | | 9/1976 |
| DE | 2653981 | | 6/1978 |
| DE | 2950341 | | 7/1980 |
| DE | 2926286 | A1 | 1/1981 |
| DE | 3016419 | | 11/1981 |
| DE | 8024829.9 | | 9/1982 |
| DE | 3111571 | A1 | 10/1982 |
| DE | 3238149 | A1 | 4/1984 |
| DE | 34 02 097 | | 8/1985 |
| DE | 3402945 | A1 | 8/1985 |
| DE | 3517122 | | 5/1986 |
| DE | 3505618 | | 8/1986 |
| DE | 3526819 | | 2/1987 |
| DE | 3016419 | C2 | 8/1987 |
| DE | 8702559 | | 10/1987 |
| DE | 3708472 | A1 | 10/1988 |
| DE | 8902223 | | 5/1989 |
| DE | 3742308 | | 6/1989 |
| DE | 8905681 | | 11/1989 |
| DE | G 90 01 265 | | 5/1990 |
| DE | 3906219 | | 8/1990 |
| DE | 4302911 | | 8/1993 |
| DE | 4208500 | A1 | 9/1993 |
| DE | 4230535 | | 3/1994 |
| DE | G 94 16 015.5 | U1 | 11/1994 |
| DE | 4321940 | | 1/1995 |
| DE | 69110099 | T2 | 2/1996 |
| DE | 692 11 891 | T2 | 10/1996 |
| DE | 19516485 | | 11/1996 |
| DE | 19727884 | | 2/1999 |
| DE | 69505433 | T2 | 4/1999 |
| DE | 19807973 | | 7/1999 |
| DE | 19824264 | | 12/1999 |
| DE | 19832990 | | 1/2000 |
| DE | 20000483 | | 8/2000 |
| DE | 10004105 | | 10/2000 |
| DE | 19958569 | | 2/2001 |
| DE | 199 41 362 | | 3/2001 |
| DE | 19945760 | | 3/2001 |
| DE | 10103221 | A1 | 8/2001 |
| DE | 10031857 | | 1/2002 |
| DE | 10031858 | | 1/2002 |
| DE | 20114257 | | 2/2002 |
| DE | 10059406 | | 6/2002 |
| DE | 10135104 | | 9/2002 |
| DE | 10135104 | C1 | 9/2002 |
| DE | 10205831 | | 8/2003 |
| DE | 10311238 | | 10/2004 |
| DE | 10 2004 027 789 | | 2/2005 |
| DE | 29825120 | | 2/2005 |
| DE | 102004027789 | A1 | 2/2005 |
| DE | 69827994 | T2 | 4/2005 |
| DE | 20320781 | | 6/2005 |
| DE | 10 2004 014 646 | | 7/2005 |
| DE | 10 2004 003 438 | | 8/2005 |
| DE | 102004003439 | | 8/2005 |
| DE | 10 2004 007 733 | | 9/2005 |
| DE | 10 2004 021 298 | | 11/2005 |
| DE | 699 28 944 | T2 | 9/2006 |
| DE | 69535077 | T2 | 11/2006 |
| DE | 202007001031 | | 3/2007 |
| DE | 60200500 1173 | | 8/2007 |
| DE | 60206956 | T2 | 8/2008 |
| DE | 102007006547 | | 8/2008 |
| DE | 102007013628 | A1 | 9/2008 |
| DE | 102007039106 | | 2/2009 |
| DE | 102007052067 | | 5/2009 |
| DE | 10 2008 010 169 | A1 | 9/2009 |
| DE | 10 2009 020 194 | A1 | 11/2010 |

(56) References Cited

FOREIGN PATENT DOCUMENTS

| | | | |
|---|---|---|---|
| DE | 20 2010 012 449 | U1 | 12/2010 |
| DE | 202010012449 | | 12/2010 |
| DE | 10 2009 032 399 | A1 | 1/2011 |
| DE | 102009053449 | | 2/2011 |
| DE | 102010060086 | | 4/2012 |
| DE | 10 2010 056 263 | A1 | 6/2012 |
| DE | 10 2011 100 806 | A1 | 11/2012 |
| DE | 102011106060 | | 1/2013 |
| DE | 20 2013 002 228 | U2 | 5/2013 |
| DE | 102011118120 | | 5/2013 |
| DE | 10 2011 120 717 | A1 | 6/2013 |
| DE | 112007001824 | B4 | 7/2013 |
| DE | 10 2012 013 464 | A1 | 11/2013 |
| DE | 10 2015 114 202 | A1 | 1/2017 |
| DE | 10 2018 118 737 | A1 | 2/2020 |
| DE | 102021124139 | A1 | 3/2023 |
| DE | 102021124140 | A1 | 3/2023 |
| DE | 102021124141 | A1 | 3/2023 |
| EM | 002066910-001 | | 3/2013 |
| EM | 002066910-0002 | | 3/2013 |
| EM | 002066910-0003 | | 3/2013 |
| EM | 002066910-0004 | | 3/2013 |
| EM | 002066910-0005 | | 3/2013 |
| EM | 002066910-0006 | | 3/2013 |
| EM | 002066910-0007 | | 3/2013 |
| EM | 002066910-0008 | | 3/2013 |
| EM | 002066910-0009 | | 3/2013 |
| EM | 002066910-0010 | | 3/2013 |
| EP | 0092043 | A2 | 10/1983 |
| EP | 0092392 | | 10/1983 |
| EP | 0114064 | A2 | 7/1984 |
| EP | 0313958 | A2 | 5/1989 |
| EP | 524408 | | 1/1993 |
| EP | 567325 | | 10/1993 |
| EP | 0631821 | | 1/1995 |
| EP | 0650766 | | 5/1995 |
| EP | 0650766 | A2 | 5/1995 |
| EP | 678334 | | 10/1995 |
| EP | 0706832 | | 4/1996 |
| EP | 0706832 | A1 | 4/1996 |
| EP | 0710506 | | 5/1996 |
| EP | 801002 | | 10/1997 |
| EP | 0846498 | A1 | 6/1998 |
| EP | 987060 | | 3/2000 |
| EP | 1081639 | | 3/2001 |
| EP | 1106262 | | 6/2001 |
| EP | 1247586 | | 10/2002 |
| EP | 1277519 | | 1/2003 |
| EP | 1294490 | | 3/2003 |
| EP | 1299194 | | 4/2003 |
| EP | 1366823 | | 12/2003 |
| EP | 1412669 | | 4/2004 |
| EP | 1424135 | | 6/2004 |
| EP | 1477232 | A1 | 11/2004 |
| EP | 1479447 | A1 | 11/2004 |
| EP | 1504823 | A1 | 2/2005 |
| EP | 1563913 | | 8/2005 |
| EP | 1574262 | | 9/2005 |
| EP | 1602412 | | 12/2005 |
| EP | 1658902 | A1 | 5/2006 |
| EP | 1708822 | | 10/2006 |
| EP | 1708823 | | 10/2006 |
| EP | 1718415 | | 11/2006 |
| EP | 1880771 | A1 | 1/2008 |
| EP | 1902766 | A1 | 3/2008 |
| EP | 1902786 | | 3/2008 |
| EP | 1902876 | | 3/2008 |
| EP | 1930084 | | 6/2008 |
| EP | 1964616 | | 9/2008 |
| EP | 1964616 | A2 | 9/2008 |
| EP | 1987886 | A2 | 11/2008 |
| EP | 197561 | A2 | 12/2008 |
| EP | 2017010 | A2 | 1/2009 |
| EP | 2027931 | | 2/2009 |
| EP | 2092987 | A1 | 8/2009 |
| EP | 2106298 | | 10/2009 |
| EP | 2111920 | | 10/2009 |
| EP | 2127758 | A1 | 12/2009 |
| EP | 2451586 | A1 | 5/2012 |
| EP | 2490819 | | 8/2012 |
| EP | 2576079 | | 4/2013 |
| EP | 2608890 | | 7/2013 |
| EP | 2 669 213 | A1 | 12/2013 |
| EP | 2703089 | A1 | 3/2014 |
| EP | 2736651 | B1 | 6/2014 |
| EP | 2 828 000 | A | 1/2015 |
| EP | 2 828 000 | A1 | 2/2015 |
| EP | 3184177 | A1 | 6/2017 |
| EP | 282800 | B1 | 8/2019 |
| FR | 398333 | | 6/1909 |
| FR | 789762 | | 11/1935 |
| FR | 1410519 | | 9/1964 |
| FR | 2444501 | | 7/1980 |
| FR | 2462200 | A1 | 2/1981 |
| FR | 2 570 140 | | 3/1986 |
| FR | 2 774 928 | | 8/1999 |
| FR | 2863512 | A1 | 6/2005 |
| FR | 2927824 | A1 | 8/2009 |
| GB | 190900523 | | 6/1909 |
| GB | 657854 | A | 9/1951 |
| GB | 2 132 916 | | 7/1984 |
| GB | 2153260 | | 8/1985 |
| GB | 2372465 | | 8/2002 |
| GB | 2411235 | | 8/2005 |
| GB | 2416141 | A | 1/2006 |
| GB | 2444909 | A | 6/2008 |
| GB | 2508446 | A | 6/2014 |
| HK | 1100405 | | 6/2009 |
| HK | 1096057 | | 7/2009 |
| HK | 1125067 | | 8/2012 |
| HK | 1138533 | | 11/2012 |
| JP | S49-136868 | | 11/1974 |
| JP | S55-107258 | U | 7/1980 |
| JP | S5654328 | | 5/1981 |
| JP | S57-75246 | | 5/1982 |
| JP | S57128346 | A | 8/1982 |
| JP | 58-119862 | | 5/1983 |
| JP | S5998757 | | 6/1984 |
| JP | S601722 | | 1/1985 |
| JP | S62160156 | A | 7/1987 |
| JP | H01-87805 | | 6/1989 |
| JP | H02258076 | A | 10/1990 |
| JP | H04-176352 | A | 6/1992 |
| JP | H0530749 | | 4/1993 |
| JP | H05172678 | | 7/1993 |
| JP | 674850 | | 3/1994 |
| JP | H06215741 | | 8/1994 |
| JP | H07204542 | A | 8/1995 |
| JP | H08196950 | | 8/1996 |
| JP | H08196950 | A | 8/1996 |
| JP | H09117697 | | 5/1997 |
| JP | 11-047643 | A | 2/1999 |
| JP | 2000015150 | A | 1/2000 |
| JP | 2000070780 | A | 3/2000 |
| JP | 2001259487 | | 9/2001 |
| JP | 2003042882 | | 2/2002 |
| JP | 2003088780 | | 3/2003 |
| JP | 2004-501763 | A | 1/2004 |
| JP | 2004017044 | | 1/2004 |
| JP | 2003-211034 | A | 5/2004 |
| JP | 2005000735 | A | 1/2005 |
| JP | 20050000735 | A | 1/2005 |
| JP | 2005-052830 | A | 3/2005 |
| JP | 2005138885 | | 6/2005 |
| JP | 2007516831 | | 6/2007 |
| JP | 2008018296 | A | 1/2008 |
| JP | 2008161789 | A | 7/2008 |
| JP | 2010-528837 | A | 8/2010 |
| JP | 2014124274 | A | 7/2014 |
| JP | 2017-135647 | A | 8/2017 |
| JP | 2018-505779 | A | 3/2018 |
| KR | 20140064644 | A | 5/2014 |
| RU | 2523816 | C1 | 1/2014 |
| TW | 491092 | | 6/2002 |

(56) References Cited

FOREIGN PATENT DOCUMENTS

| | | | |
|---|---|---|---|
| TW | 510253 | U | 11/2002 |
| TW | I220392 | | 8/2004 |
| TW | I303587 | | 12/2008 |
| TW | I309584 | | 5/2009 |
| TW | 201020031 | A | 6/2010 |
| WO | 90/008456 | | 8/1990 |
| WO | 91/16610 | | 10/1991 |
| WO | 1992/07346 | | 4/1992 |
| WO | 9522409 | | 8/1995 |
| WO | 1998/32539 | | 7/1998 |
| WO | 01/012337 | | 2/2001 |
| WO | 2001/12337 | | 2/2001 |
| WO | 0186261 | | 9/2001 |
| WO | 01/099062 | | 12/2001 |
| WO | 02/000355 | | 1/2002 |
| WO | 0202242 | | 1/2002 |
| WO | 02/018061 | | 3/2002 |
| WO | 02/085533 | | 10/2002 |
| WO | 03/007252 | | 1/2003 |
| WO | 03/045575 | | 6/2003 |
| WO | 03/069208 | | 8/2003 |
| WO | 03069208 | A1 | 8/2003 |
| WO | 03/086654 | A1 | 10/2003 |
| WO | 04/037433 | | 5/2004 |
| WO | 2004/37433 | | 5/2004 |
| WO | 04/052552 | | 6/2004 |
| WO | 05/018815 | | 3/2005 |
| WO | 05/068220 | | 7/2005 |
| WO | 05/070557 | | 8/2005 |
| WO | 05/070558 | | 8/2005 |
| WO | 05/077543 | | 8/2005 |
| WO | 05/115631 | | 12/2005 |
| WO | 2006065850 | | 6/2006 |
| WO | 07/128127 | | 11/2007 |
| WO | 2007133386 | A2 | 11/2007 |
| WO | 2007/149760 | A2 | 12/2007 |
| WO | 2008/093866 | A1 | 8/2008 |
| WO | 2009015260 | | 1/2009 |
| WO | 2009015260 | A2 | 1/2009 |
| WO | 2009/054986 | A1 | 4/2009 |
| WO | 2009056424 | | 5/2009 |
| WO | 2010019274 | A1 | 2/2010 |
| WO | 2010/044864 | A1 | 4/2010 |
| WO | 2011047876 | | 4/2011 |
| WO | 2011147555 | | 12/2011 |
| WO | 2012013574 | A1 | 2/2012 |
| WO | 2012052255 | A1 | 4/2012 |
| WO | 2012/119578 | A1 | 9/2012 |
| WO | 2012119664 | | 9/2012 |
| WO | 2013000524 | | 1/2013 |
| WO | 2013016474 | | 1/2013 |
| WO | 2013/131626 | A1 | 9/2013 |
| WO | 2013142045 | A1 | 9/2013 |
| WO | 2014 006 593 | A1 | 1/2014 |
| WO | 2015/125619 | A1 | 8/2015 |
| WO | 2016127106 | A1 | 8/2016 |
| WO | 2016/188804 | A1 | 12/2016 |
| WO | 2017096740 | A1 | 6/2017 |
| WO | 2018/197025 | A1 | 10/2017 |
| WO | 2020/053153 | A | 3/2020 |
| WO | 2020/086977 | A1 | 4/2020 |

OTHER PUBLICATIONS

Examination Report from the European Patent Office dated Nov. 23, 2021 for European Patent Application No. 19183380.5

Office Action dated Mar. 29, 2023 for U.S. Appl. No. 17/264,372.

Search Report dated Jan. 26, 2022, for Chinese Patent Appl. No. 2019107032612 with translation.

Japanese Office Action dated Jun. 28, 2023 for Japanese Patent Application No. 2021-537499 with translation.

For U.S. Appl. No. 16/524,838, Response and Request for Continued Exam filed Oct. 22, 2021.

German Search Report dated May 7, 2019 for Application No. 10 2018 122 004.9.

German Search Report dated May 26, 2021, for DE 10 2020 123 769.3, with machine translation.

Decision on Rejection dated Feb. 10, 2023 for Chinese Patent Application No. 2018800961965.

Search Report dated Jan. 30, 2023 for Chinese Patent Application No. 2018800961965.

International Preliminary Report on Patentability dated Sep. 6, 2022 with Written Opinion for PCT/EP2021/053940 (English Translation).

International Preliminary Report on Patentability dated Sep. 6, 2022 with Written Opinion for PCT/EP2021/054059 (English Translation).

International Preliminary Report on Patentability dated Sep. 6, 2022 with Written Opinion for PCT/EP2021/054061 (English Translation).

International Search Report and Written Opinion for PCT/EP2021/54059, filed Feb. 18, 2021.

European Search Report dated Feb. 4, 2022 for Application No. 21191428.8.

International Search Report and Written Opinion for PCT/EP2021/53940, filed Feb. 18, 2021.

Japanese Office Action dated Mar. 6, 2024 for Japanese Patent Application No. 2021-537499 (11 pages).

Search Report for German Application No. 10 2021 124 140.5, filed Sep. 17, 2021.

International Search Report with Written Opinion for PCT/EP2022/075664, filed Sep. 15, 2022.

Search Report for German Application No. 10 2021 124 139.1, filed Sep. 17, 2021.

International search Report with Written Opinion for PCT/EP2022/075666, filed Sep. 15, 2022.

For U.S. Appl. No. 17/410,124, Final Office Action dated Mar. 14, 2024.

Second Office Action dated Aug. 26, 2022 for Chinese Patent Application No. 2019107032612.

For Chinese Application No. 201910704447.X: Search Report, dated Aug. 25, 2022 Second Office Action, dated Sep. 1, 2022.

For Chinese Patent Application No. 2019800593031 First Office Action dated Apr. 25, 2022 (Eng. translation) Chinese Search Report dated Apr. 19, 2022.

International Preliminary Report on Patentability with Written Opinion dated Mar. 9, 2021 for PCT/EP2019/074000 filed Sep. 9, 2019.

Notice of Allowance dated Aug. 25, 2023 for U.S. Appl. No. 16/524,838.

Notice of Allowance dated Jun. 27, 2023 for U.S. Appl. No. 16/524,740.

Office Action dated Feb. 24, 2023 for U.S. Appl. No. 16/524,740.

Final Office Action dated May 12, 2022, for U.S. Appl. No. 16/524,838.

International Search Report and Written Opinion for PCT/EP2021/054061, filed Apr. 16, 2021.

Zhu Zhifu, “Simulation and Experimental Study on Spray Characteristics of Gas-Assisted Urea Spray Gun”, Aug. 6, 2019, pp. 1-6.

International Preliminary Report on Patentability dated Jan. 31, 2023 with Written Opinion for International Application No. PCT/EP2021/071252 filed Jul. 29, 2021.

Office Action dated Dec. 2, 2022, for U.S. Appl. No. 16/524,838.

U.S. Appl. No. 17/410,124, Office Action dated Oct. 30, 2023.

Final Rejection dated Jul. 22, 2021, for U.S. Appl. No. 16/524,838.

Notice of Allowance dated Jul. 26, 2021, for U.S. Appl. No. 15/575,549.

International Preliminary Report on Patentability dated Mar. 9, 2021 with Written Opinion for PCT/EP2019/074000, filed Sep. 9, 2019 (English translation) (7 pages)

Office Action dated Aug. 12, 2021 for U.S. Appl. No. 15/679,533.

Husky Gravity Feed HVLP Spray Gun (2016) https://www.homedepot.com/husky-gravity-feed-hvlp-spray-gun-H4840GHVSG/203497519.

Northern Industrial Paint Spray Gund and Hoses (2008) https://www.northerntool.com/products/northern-industrial-paint-spray-gun-and-hoses-158970.

(56) References Cited

OTHER PUBLICATIONS

International Search Report dated Aug. 31, 2016 for PCT/EP2016/061057 filed May 18, 2016.
Written Opinion for PCT/EP2016/061057 filed May 18, 2016.
Final Office Action dated Sep. 23, 2020, for U.S. Appl. No. 15/575,549.
Notice of Allowance dated Sep. 17, 2020 for U.S. Appl. No. 15/679,461.
Final Office Action dated Sep. 4, 2020 for U.S. Appl. No. 15/679,533.
For U.S. Appl. No. 15/679,533, Interview Summary dated June 17, 2020 Response to Office Action, filed Jun. 30, 2020.
Office Action dated Jun. 12, 2020, for U.S. Appl. No. 15/575,549.
Office Action dated Mar. 30, 2020, for U.S. Appl. No. 15/679,533.
Response to Office Action dated Mar. 9, 2020 for U.S. Appl. No. 14/815,210.
Notice of Allowance for U.S. Appl. No. 14/815,210 dated Mar. 25, 2020.
Office Action of U.S. Appl. No. 15/679,461 dated Mar. 31, 2020.
Final Office Action dated Feb. 27, 2020 for U.S. Appl. No. 15/575,549.
German Search Report dated Mar. 15, 2016 for Application No. 20 2015 003 664.3, 8 pages
Chinese Search Report dated Feb. 21, 2019 for Application No. 2016800293781, 3 pages
Final Office Action dated Aug. 12, 2019 from U.S. Appl. No. 14/815,210.
Search Report dated Feb. 22, 2019 for German Patent Application No. 10 2018 118 738.6.
Search Report dated Feb. 8, 2019 for German Patent Application No. 10 2018 118 737.8.
Notice of Allowance dated Jul. 1, 2019 for U.S. Appl. No. 15/379,972.
Notice of Allowance dated Jul. 9, 2019 for U.S. Appl. No. 15/679,482.
Response filed May 28, 2019 for U.S. Appl. No. 15/379,972.
Final Office Action for U.S. Appl. No. 15/679,461 dated Jun. 11, 2019.
Final Office Action for U.S. Appl. No. 15/679,533 dated Jul. 12, 2019
Response to Office Action dated Apr. 5, 2019 for U.S. Appl. No. 15/679,461 (29 pages).
Response to Office Action dated Apr. 9, 2019 for U.S. Appl. No. 15/679,533 (22 pages).
Restriction Requirement dated Mar. 18, 2019, for U.S. Appl. No. 29/596,869.
Office Action dated Mar. 15, 2019, for U.S. Appl. No. 14/815,210.
Office Action dated Jan. 25, 2019 for U.S. Appl. No. 15/379,972.
Office Action, dated Jan. 15, 2019, for U.S. Appl. No. 15/679,533.
Office Action, dated Jan. 15, 2019, for U.S. Appl. No. 15/679,461.
Office Action, dated Jan. 9, 2019, for U.S. Appl. No. 15/679,482.
Response to Election of Species Requirement and Amendment filed Oct. 15, 2018 from U.S. Appl. No. 15/679,482.
Chinese Search Report dated Jul. 18, 2018 for Application No. 2014103745834 filed Jul. 31, 2014.
DesignView of CN302452159 registered Jun. 5, 2013, printed Oct. 18, 2018.
Final Office Action dated Sep. 12, 2018 in U.S. Appl. No. 14/815,210.
European Search Report dated Jan. 24, 2018 for Application No. 17186905.
Restriction Requirement Office Action dated Aug. 28, 2018 in U.S. Appl. No. 15/679,533.
Restriction Requirement Office Action dated Aug. 28, 2018 in U.S. Appl. No. 15/679,461.
Notice of Allowance dated Sep. 14, 2018 in U.S. Appl. No. 29/618,945.
Notice of Allowance dated Sep. 14, 2018 in U.S. Appl. No. 14/113,649.
Response to Office Action dated Jun. 25, 2018 for U.S. Appl. No. 14/815,210.
Response to Final Office Action dated Aug. 22, 2018 for U.S. Appl. No. 14/113,649.
May 22, 2018 Final Office Action for U.S. Appl. No. 14/113,649.
Jun. 25, 2018 Response to Office Action for U.S. Appl. No. 14/815,210.
Office Action for U.S. Appl. No. 14/815,210 , dated April 3, 2018
Response for U.S. Appl. No. 14/113,649, filed Mar. 3, 2018.
German Search Report dated Apr. 10, 2018 for Application No. 10 2017 118 599.2.
European Search Report dated May 8, 2017 for Application No. EP16203544.
"Spray Guns/sata.com", Oct. 18, 2015. XP055364928 URL:http://web.archive.org/web/20151018205307/http://www.sata.com/index.php?id=lackierpistolen&L=11 [gefunden am Apr. 13, 2017]; reprinted on Dec. 8, 2017.
"SATAjet 5000 B Lackierpistolen | Bechersysteme | Atemschutz | Filtertechnik | Zubehor So flexibel wie Ihre Aufgaben" Apr. 11, 2017, XP055364477 Gefunden im Internet: URL:https/www.sata.com/uploads/tx_pxspecialcontent/00_SATAjet_5000_B.pdf [gefunden am Apr. 12, 2017]; English translation of full brochure attached.
Amendments submitted to European Patent Office on Dec. 3, 2017 for Application No. EP16203544 (with English translation of chart on p. 3).
Final Office Action dated Dec. 7, 2017 for U.S. Appl. No. 14/815,210.
Written Opinion dated Sep. 8, 2016 for International Application No. PCT/EP2016/061057 filed May 18, 2016.
International Search Report dated Jul. 14, 2016 for International Application No. PCT/EP2016/000809, filed May 17, 2016.
Written Opinion for International Application No. PCT/EP2016/000809, filed May 17, 2016.
European Search Report dated Feb. 21, 2020 for Application No. 19183382.1.
Response dated Feb. 19, 2020 for U.S. Appl. No. 15/575,549.
European Search Report, dated Jan. 20, 2020, for European Application No. 19183380.
Response to Final Office Action, dated Nov. 11, 2019, for U.S. Appl. No. 14/815,210 20 pages.
Office Action, dated Nov. 20, 2019, for U.S. Appl. No. 15/575,549 12 pages
Office Action, dated Dec. 9, 2019, for U.S. Appl. No. 14/815,210 6 pages
Response to Restriction Requirement filed Oct. 29, 2019 for U.S. Appl. No. 15/575,549.
RCE Reply filed Oct. 11, 2019 for U.S. Appl. No. 15/679,461.
Japanese Office Action dated Sep. 25, 2019 for Japanese Publication No. 2015-149405, 4 pages.
Office Action dated Feb. 19, 2021 for U.S. Appl. No. 15/575,549.
Intemational Search Report dated Nov. 13, 2019 for PCT/EP2019/074000, filed Sep. 9, 2019.
Written Opinion or PCT/EP2019/074000, filed Sep. 9, 2019.
Office Action dated Feb. 5, 2021 for U.S. Appl. No. 16/524,740.
Office Action dated Feb. 5, 2021 for U.S. Appl. No. 16/524,838.
International Search Report dated Apr. 12, 2019 and Written Opinion for PCT/DE18/100679, filed Aug. 1, 2018 (21 pages).
Response to Final Office Action, filed Jan. 4, 2021, for U.S. Appl. No. 15/679,533 (18 pages).
Response to Restriction Requirement, filed Jan. 25, 2021, for U.S. Appl. No. 16/524,740 (9 pages).
International Search Report dated Apr. 12, 2019 for PCT/DE2018/100679 filed Aug. 1, 2018.
Written Opinion for PCT/DE2018/100679 filed Aug. 1, 2018.
Chinese Search Report for Application No. 2017107135569 dated Aug. 24, 2020 and English transiation.
Restriction/Species requirement dated Dec. 7, 2020 for U.S. Appl. No. 16/524,838.
International Search Report, Written Opinion and International Preliminary Report on Patentability for PCT/EP2004/005381 file May 19, 2004.
Intemational Search Report, Written Opinion and International Preliminary Report on Patentability for PCT/EP2004/011998 filed Oct. 23, 2004.
International Search Report, Written Opinion and International Preliminary Report on Patentability for PCT/EP2005/000435 filed Jan. 18, 2005.

(56) References Cited

OTHER PUBLICATIONS

International Search Report, Written Opinion and International Preliminary Report on Patentability for PCT/EP2005/00437 filed Jan. 18, 2005.
Intemational Search Report, Written Opinion and International Preliminary Report on Patentability for PCT/EP2008/063344, filed Oct. 6, 2008.
International Search Report, Written Opinion and International Preliminary Report on Patentability for PCT/EP2010/002392 filed Apr. 20, 2010.
lntemational Search Report, Written Opinion and International Preliminary Report on Patentability for PCT/EP2011/002544 filed May 21, 2011.
International Search Report, Written Opinion and International Preliminary Report on Patentability for PCT/EP2011/066665 filed Sep. 26, 2011.
International Search Report, Written Opinion and International Preliminary Report on Patentability for PCT/EP2010/003399 filed Jun. 7, 2010.
International Search Report, Written Opinion and International Preliminary Report on Patentability for PCT/EP2011/5842 filed Dec. 2, 2010.
international Search Report, Written Opinion and International Preliminary Report on Patentability for PCT/EP2012/01939 filed May 5, 2012.
International Search Report, Written Opinion and International Preliminary Report on Patentability for PCT/EP2009/06992 filed Sep. 29, 2009.
Internet Archive Wayback Machine [online] [captured Sep. 25, 2012] [retrieved on Sep. 8, 2014] retrieved from the Internet URL:http://web.archive.org/web/20120925210554/http://www.sata.com/index.php?id=sal-check&no cache=1&L=11.
JP Office Action issued against JP Patent App. 2012-508926 on Feb. 25, 2014 with English translation.
Office Action dated Aug. 7, 2015 for U.S. Appl. No. 13/991,285.
Response filed Oct. 6, 2015 to Notice of Non-Compliant Amendment for U.S. Appl. No. 13/698,417.
Notice of Non-Compliant Amendment dated Aug. 10, 2015 for U.S. Appl. No. 13/698,417.
Final Office Action dated Oct. 16, 2015 for U.S. Appl. No. 13/698,417.
Extended European Search Report dated Apr. 17, 2015 for European Application No. 14004167.4.
Printout from Internet www.ehow.com explaining how to choose a spray gun and stating in item 2 “Nozzle sizes vary between about 1 mm and 2 mm.”, printed Sep. 7, 2012 (Exhibit 1023 in IPR 2013-0111)
Printout from Internet www.bodyshopbusiness.com explaining how to choose nozzle setup in paragraph bridging pp. 1 and 2, giving general rule of thumb of nozzle sizes from 1.3 mm to 2.2 mm, depending on material being sprayed, printed Sep. 7, 2012 (Exhiblt 1024 in IPR 2013-0111).
Printout from Internet of pages from brochure of Walther Pilot showing nozzle sizes for spray guns ranging from 0.3 mm to 2.5 mm, dated 2007, (Exhibit 1025 in IPR 2013-0111).
Printout from Internet www.alsacorp.com showing in the paragraph bridging pp. 2 and 3, Model VS-7200 Saber LVLP spray gun with nozzle size 1.3 mm with sizes 1.3 to 2.0 available, printed Aug. 26, 2012 (Exhibit 1026 in lPR 2013-0111).
Printout from Internet of copy of p. 28 from current 3Mth brochure showing Tip/Nozzle/Air Cap Selection Guide with nozzle sizes from 0.5 mm to 3.0 mm., (Exhibit 1027 in IPR 2013-0111).
Decision by EPO regarding opposition proceedings to revoke patent no. 99926841.0-2425/ 1108476, corresponding to '387 patent, 2012, (Exhibit 1029 in IPR 2013-0111).
SATA News Publication Dan-Am Jul.-Sep. 1996, (Exhibit 1034 in IPR 2013-0111).
SATA News Publication Dan-Am Oct.-Dec. 1996, (Exhibit 1035 in IPR 2013-0111).
SATA News Publication Dan-Am Apr.-Jun. 1998 (Exhibit 1036 in IPR 2013-0111).
Dan-Am SATA Catalog 6 for spray guns 1991 (Exhibit 1037 in IPR 2013-0111).
Dan-Am SATA Catalog 8 for spray guns 1994 (Exhibit 1038 in IPR 2013-0111).
Dan-Am Catalog 6—51pp published 1991, (Exhibit 1042 in IPR 2013-0111).
Japanese Industrial Standards B 9809 English translation, 1992 (Exhibit 1049 in IPR 2013-0111).
Japanese Industrial Standards B 9809 revised Mar. 1, 1991 (Exhibit 1050 in IPR 2013-0111).
SATA News, vol. 21, 2009 (Exhibit 2010 in IPR 2013-0111).
Collision Hub TV Document (image from video clip) printed Oct. 9, 2013 (Exhibit 2011 in IPR 2013-0111).
MyRielsMe.com document from press release printed Oct. 9, 2013 (Exhibit 2012 in IPR 2013-0111).
How to set Air pressure, Utube screenshot printed Oct. 9, 2013 (Exhibit 2013 in IPR 2013-0111).
Ohio EPA Letty to Tony Larimer, response to letter dated Aug. 2006 (Exhibit 2014 in IPR 2013-0111).
Pinahs Ben-Tzvi et al, A conceptual design . . . , Mechatrronics 17 (2007) p. 1-13 (Exhibit 2015 in IPR 2013-0111).
On line ad from Amazon.com printed Oct. 14, 2013 (Exhibit 2017 in IPR 2013-0111).
Rone et al, MEMS-Baed Microdroplet Generation with Integrated Sensing, COMSOL. 2011 (Exhibit 2018 in IPR 2013-0111).
International Search Report (dated Jun. 20, 2008). Written Opinion (dated Jun. 20, 2008), and International Preliminary Report on Patentability (dated Sep. 14, 2010) from PCT/US2008/03318 filed Mar. 12, 2008.
Response filed Dec. 7, 2015 to Office Action dated Aug. 7, 2015 for U.S. Appl. No. 13/991,285.
Response filed Dec. 21, 2015 to Office Action dated Jul. 20, 2015 for U.S. Appl. No. 14/113,649.
Office Action dated Dec. 31, 2015 for U.S. Appl. No. 14/572,998.
Notice of Allowance dated Jan. 19, 2016 for Design U.S. Appl. No. 29/539,615.
Notice of Allowance dated Jan. 22, 2016 for U.S. Appl. No. 13/991,285.
Notice of Allowance dated Jan. 27, 2016 for Design U.S. Appl. No. 29/510,723.
Office Action dated Feb. 19, 2016 for U.S. Appl. No. 14/113,649.
Final Office Action dated Feb. 25, 2016 for U.S. Appl. No. 13/698,417.
Restriction Requirement dated Mar. 25, 2016 for Design U.S. Appl. No. 29/516,082.
Response filed Mar. 31, 2016 to Office Action dated Dec. 31, 2016 for U.S. Appl. No. 14/572,998.
Notice of Allowance dated Apr. 18, 2016 for U.S. Appl. No. 14/572,998.
Response filed Apr. 27, 2016 to Office Action dated Jan. 29, 2016 for U.S. Appl. No. 13/380,949.
German Search Report dated Apr. 12, 2016 for related German Application No. 10 2015 008 735.5.
Response restriction requirement filed May 23, 2016 for Design U.S. Appl. No. 29/516,082.
Second Chinese Office Action dated Jun. 24, 2015 for Chinese Application No. 2011800266029.
Third Chinese Office Action dated Nov. 30, 2015 for Chinese Application No. 2011800266029.
Final Office Action dated Aug. 29, 2016 for U.S. Appl. No. 14/113,649.
Office Action dated Nov. 2, 2016 for U.S. Appl. No. 11/949,122.
Response to Final Office Action and RCE dated Nov. 29, 2016 in U.S. Appl. No.14/113,649.
Notification of the First Office Action with search report dated Aug. 24, 2015 for Chinese Application No. 201280020519.5 (related to U.S. Appl. No. 14/113,649), 13 pages.
Notification of the Second Office Action dated May 16, 2016, for Chinese Application No. 201280020519.5 (related to U.S. Appl. No. 14/113,649), 5 pages.
Japanese Office Action for JP2014-517485 (related to U.S. Appl. No. 14/113,649), dated Jul. 5, 2016, 16 pages.
Response to Office Action filed Feb. 16, 2016 for U.S. Appl. No. 13/698,417.

(56) References Cited

OTHER PUBLICATIONS

Screen shot of a SATA product (SATAjet B) description retrieved on Feb. 12, 2016 from www.sata.com/index.php.
"The Hot Rolling Process;" California Steel; retrieved on Feb. 12, 2016 from http://www.californiasteel.com/GetPublicFile.aspx?id=53.
German Search Report for Application No. 10 2016 009 957.7 dated Apr. 21, 2017.
Office Action from U.S. Appl. No. 15/143,698 dated Jan. 5, 2017.
German Search Report for Geman Application No. 10 2015 016 474.0 dated Aug. 9, 2016, 14 pages.
Notice of Allowance in U.S. Appl. No. 29/556,463, filed Mar. 1, 2016, 9 pages.
Notice of Allowance in U.S. Appl. No. 29/555,656, filed Feb. 24, 2016, 5 pages.
International Preliminary Report on Patentability for PCT/EP2015/001728 filed Aug. 25, 2015.
Final Office Action dated Mar. 16, 2017 from U.S. Appl. No. 13/698,417, 9 pages.
Restriction Requirement Office Action dated Apr. 17, 2017 for U.S. Appl. No. 14/815,210.
Notice of Allowance dated Apr. 10, 2017 for U.S. Appl. No. 29/579,824.
Response to Final Office Action filed May 9, 2017 in U.S. Appl. No. 13/698,417.
Response to Office Action filed May 17, 2017 in U.S. Appl. No. 14/113,649.
Office Action dated Jun. 30, 2017 for U.S. Appl. No. 14/815,210.
Final Office Action in U.S. Appl. No. 14/113,649 dated Jun. 22, 2017.
Response filed in U.S. Appl. No. 15/143,698 dated Jul. 3, 2017.
Response to Restriction Requirement filed in U.S. Appl. No. 14/815,210 dated Jun. 19, 2017.
German Search Report dated Apr. 21, 2017 for application No. 10 2016 009 957.7.
Office Action dated Nov. 18, 2014 for U.S. Appl. No. 14/113,649.
Notice of Allowance dated Nov. 19, 2014 for U.S. Appl. No. 29/486,223.
Office Action dated Dec. 31, 2014 for U.S. Appl. No. 13/380,949.
Restriction Requirement Jan. 9, 2015 for Design U.S. Appl. No. 29/469,049.
Response to Office Action filed Dec. 2, 2014 for U.S. Appl. No. 29/487,679.
Notice of Allowance dated Jan. 15, 2015 for Design U.S. Appl. No. 29/490,620.
Office Action dated Jan. 14, 2015 for Design U.S. Appl. No. 29/447,887.
Hercules Paint Gun Washers brochure publish date Jan. 2012. [online], [site visited Jan. 7, 2015], <http://www.herkules.us/pdfs/L00761-Hercules-Gun_Washers-4-page-brochure.pdf>.
Jetclean GUn Cleaner Terry's Auto Supply, google publish date Aug. 4, 2011. [online]. [site visited Jan. 7, 2015], <http://secure.terrys.net/viewProduct.php?productID=FT.FHAZ1005>.
Restriction Requirement dated Feb. 6, 2015 for Design U.S. Appl. No. 29/486,232.
Office Action dated Mar. 30, 2015 for U.S. Appl. No. 13/698,417.
Responde to Office Action filed Apr. 14, 2015 to Office Action dated Jan. 14, 2015 for U.S. Appl. No. 29/447,887.
Response filed Jul. 20, 2015 for Office Action dated Mar. 30, 2015 for U.S. Appl. No. 13/698,417.
Notice of Allowance dated Apr. 30, 2015 for U.S. Appl. No. 29/447,887.
Chinese Office Action dated Oct. 28, 2014 and Search Report dared Oct. 15, 2014 for Chinese Application No. 2011800266029.
Australian Examination Report dated Oct. 30, 2012 for Australian Application No. 2010268870.
Notice of Allowance dated Apr. 24, 2015 for Design U.S. Appl. No. 29/486,232.
Restriction Requirement dated Jan. 22, 2015 for U.S. Appl. No. 13/698,417.
Response filed Mar. 23, 2015 to Restriction Requirement dated Jan. 22. 2015 for U.S. Appl. No. 13/698,417.
Response filed Apr. 6, 2015 to Office Action dated Feb. 8, 2015 for Design U.S. Appl. No. 29/488,232.
Response filed Mar. 31, 2015 to Office Action dated Dec. 31, 2014 for U.S. Appl. No. 13/380,949.
Japanese Ofice Action dated Jun. 11, 2014 for Japanese Patent Application No. 2012-518769.
Australian Examination Report dated Nov. 11, 2014 for Australian patent Application No. 2011257605.
Japanese Notice of Allowance mailed Jan. 13, 2015 for Japanese Patent Application No. 2012/518769.
Application filed Dec. 11, 2011 for U.S. Appl. No. 13/380,949.
Chinese Office Action dated Jan. 28, 2014 and Search Report dated Jan. 21, 2014 for Chinese Application No. 201080030935.4.
Search Report dated Apr. 24, 2010 for German Application No. 10 2009 032 399.6-51.
Application filed Oct. 24, 2013 for U.S. Appl. No. 14/113,649.
Response filed May 18, 2015 to Office Action dated Nov. 18. 2014 for U.S. Appl. No. 14/113,649.
Application filed Dec. 17, 2014 for U.S. Appl. No. 14/572,998.
German Search Report dated Mar. 25. 2014 for German Application No. 202013105779-7.
Application filed Nov. 16, 2012 for U.S. Appl. No. 13/698,417.
Application filed Jun. 2, 2013 for U.S. Appl. No. 13/991,285.
English translation of application filed Aug. 13, 2013 for Application filed Jun. 2, 2013 for U.S. Appl. No. 13/991,285.
Restriction Requirement dated May 27, 2015 for U.S. Appl. No. 13/991,285.
Application filed Jan. 29, 2015 for Design U.S. Appl. No. 29/516,073.
Application filed Jan. 29, 2015 for Design U.S. Appl. No. 29/516,082.
Application filed Mar. 3, 2015, 2015 for Design U.S. Appl. No. 29/518,198.
Final Office Action dated Jul. 20, 2015 for U.S. Appl. No. 14/113,649.
Response filed Jul. 27, 2015 to Restriction Requirement dated May 27, 2015 for U.S. Appl. No. 13/991,285.
Application filed Jul. 31, 2015 for U.S. Appl. No. 14/815,210.
Final Office Action dated Aug. 4, 2015 for U.S. Appl. No. 13/380,949.
Notice of Allowance dated Aug. 3, 2015 for U.S. Appl. No. 29/486,232.
Canadian Office Action dated Nov. 21, 2012 for related application CA2741703.
Chinese Search Report dated Dec. 5, 2012 for related application CN200980135429.9.
Chinese Office Action dated Dec. 13, 2012 for related application CN200980135429.9.
German Search Report for DE 20 2008 014 389.6 completed Jul. 13, 2009.
German Patent Office Action dated Nov. 4, 2022 for German Application No. 19 183 380.5-1005.
German Patent Office Action dated May 19, 2023 for German Application No. 19 183 380.5-1005.
Chinese Notification of the Third Office Action dated Feb. 14, 2023 for Chinese Patent Application No. 2019107032612, 15 pages.
European Office Action dated Mar. 21, 2023 for European Patent Application No. 19 183 382.1, 12 pages.
Third Office Action dated Feb. 15, 2023 for Chinese Patent Application No. 20191070444.X.
Office Action dated Dec. 9, 2021 for U.S. Appl. No. 16/524,838.
Final Office Action dated May 2, 2022 for U.S. Appl. No. 16/524,740.
Response filed May 5, 2021 for U.S. Appl. No. 16/524,740.
Response filed May 5, 2021 for U.S. Appl. No. 16/524,838.
International Preliminary Report on Patentability dated Feb. 2, 2021 and Written Opinion for PCT/DE2018/100679 filed Aug. 1, 2018 (English Translation).
Notice of Allowance dated May 18, 2021 for U.S. Appl. No. 29/730,873.
Anonymous: "DeVilbiss Automotive RefinishingSpray Gun Setup", Jan. 27, 2015 (Jan. 27, 2015), XP055580418, retrieved from the Internet: URLhttps://web.archive.org/web/20150127025402lhttp://www.autorefinishdevilbiss.com.spray-gun-setup.aspx.

(56) References Cited

OTHER PUBLICATIONS

Anonymous: "DeVilbiss—Spray Gun Tool on the AppStore", Oct. 19, 2015 (Oct. 19, 2015), XP055580448, retrieved from the Internet: URLhttps://itunes.apple.comlus/app/ devilbiss-spray-gun-tool/ id590404917?mt=8.
Final Office Action dated Jun. 1, 2021 for U.S. Appl. No. 16/524,740.
Office Action dated Nov. 24, 2021 for U.S. Appl. No. 16/524,740.
Final Office Action dated Nov. 23, 2021 for U.S. Appl. No. 15/679,533.
Examination Report from the European Patent Office dated Nov. 8, 2021 for European Patent Application No. 19183382.1.
Search Report dated Jan. 29, 2022, for Chinese Patent Appl. No. 201910704447X, with translation.
Search Report dated Jan. 7, 2022, for Chinese Patent Appl. No. 2018800961965, with translation.
Office Action dated Apr. 26, 2022 for U.S. Appl. No. 15/679,533.
For Chinese Application No. 2018800961965: Search Report, dated Aug. 1, 2022 (English translation) Second Office Action, dated Aug. 12, 2022 (English translation)).
For U.S. Appl. No. 16/524,740, Interview Summary and Advisory Action dated Aug. 30, 2021.
European Office Action dated Mar. 15, 2024 for European Patent Application No. 21 706 892.3.
European Office Action dated Mar. 7, 2024 for European Patent Application No. 21 706 572.1.
European Office Action dated Mar. 6, 2024 for European Patent Application No. 21 191 428.8.
European Office Action dated Mar. 14, 2024 for European Patent Application No. 21 706 923.6.
For U.S. Appl. No. 17/410,124, Response filed May 8, 2024 Notice of Allowance dated May 20, 2024.
Office Action dated May 10, 2024, for European Patent Application No. 19 768 753.6.

* cited by examiner

PAINT GUN, MATERIAL APPLICATION SYSTEM, AND METHOD FOR OPERATING SAME

FIELD OF THE INVENTION

The invention relates to a paint spray gun for the atomization, in particular the compressed-air-assisted atomization, and application of a coating material, in particular a paint, wherein the paint spray gun has a material-conveying part with a material feed, a nozzle head and a material channel set-up, by means of which a coating material fed to the material feed can be supplied to the nozzle head, wherein the paint spray gun additionally has a non-material-conveying part and a transmitting and/or receiving device for wirelessly transmitting signals.

The invention also relates to a material application system having such a paint spray gun and to a method for operating a material application system.

BACKGROUND

A paint spray gun mentioned at the outset and a material application system having such a paint spray gun have been disclosed, for example, by WO 2012/052255 A1. In particular, said document describes a material application system in the form of a paint application system having one or more receiving units for wirelessly transmitting signals between components of the paint application system, wherein one of the components is a paint spray gun having a capture unit for capturing operating parameters of the paint spray gun and/or environmental parameters and having a transmitting unit for wirelessly transmitting the operating parameters and/or environmental parameters to the receiving unit.

SUMMARY

One aspect of the present invention relates to further developing the known paint spray gun and the known material application system in such a manner that the result is a paint spray gun and a material application system distinguished by increased functional reliability and user-friendliness which is optimized for use in paint spray booths.

The paint spray gun according to the invention is used to atomize and apply a coating material, in particular a liquid coating material. It has a material-conveying part with a material feed, a nozzle head and a material channel set-up, by means of which a (liquid) coating material fed to the material feed can be supplied to the nozzle head. The material-conveying part of the paint spray gun is preferably of multipart design. In particular, it is in the form of a separate interchangeable part into which the material channel set-up opens.

The material channel set-up and the material feed are formed, for example, inseparably from a common component, in particular a base body of the paint spray gun or the material-conveying part of the base body.

The paint spray gun additionally has a non-material-conveying part which is formed, for example, by a different part of the base body than the material-conveying part. The non-material-conveying part may preferably also be in the form of a component which is separate from the material-conveying part of the paint spray gun. Alternatively or additionally, the non-material-conveying part may be provided as a handling part. For this purpose, it may have connection means for handling apparatuses, such as handling robots, and/or a handle or gripping elements for a painter.

Increased functional reliability is achieved by means of the paint spray gun according to the invention by virtue of the paint spray gun having a transmitting and/or receiving device for wirelessly transmitting signals which is at a distance from the material-conveying part and is associated with the non-material-conveying part. The transmitting and/or receiving device is consequently not integrated in the material-conveying part and is not arranged in a manner immediately adjacent to the material-conveying part.

The arrangement of the transmitting and/or receiving device substantially reduces the risk of the coating material being applied to the transmitting and/or receiving device and therefore substantially reduces damage or impairment of the transmitting and/or receiving device.

The coating materials conventionally used with a paint spray gun, such as paints in particular, make it necessary to carefully clean the material-conveying part of the paint spray gun, both mechanically and using solvents. The arrangement according to the invention of the transmitting and/or receiving device reduces the risk of damage or impairment of the transmitting and/or receiving device when cleaning the paint spray gun.

In the case of one preferred exemplary embodiment, the transmitting and/or receiving device is arranged in or on the non-material-conveying part, in particular is integrated and/or encapsulated in the non-material-conveying part.

The paint spray gun according to the invention is preferably a flow cup spray gun, that is to say the material feed has a connection device for a flow cup. Alternatively or additionally, the paint spray gun may also be in the form of a paint spray gun with pressure-assisted material feed (for example a boiler or robot spray gun) or may have a material feed which is suitable for connecting a material hose.

The transmitting and/or receiving device is preferably suitable for bidirectionally wireless data transmission. This is consequently a transmitting and receiving device in this case.

Explosive gas mixtures may arise during painting. Therefore, strict explosion protection requirements apply, in particular in paint spray booths and for all devices used there. The transmitting and/or receiving device is therefore preferably configured such that these requirements are met. In particular, this is effected by means of appropriate encapsulation and/or an appropriate structure of the electronic components.

One exemplary embodiment of the invention, in which the paint spray gun is in the form of a handheld paint spray gun, is particularly relevant in practice. The non-material-conveying part is preferably in the form of a handling part. The non-material-conveying part has a handle, for example, in which case an actuation lever of the paint spray gun is preferably articulated to the material-conveying part.

However, the paint spray gun may also be actuated, for example, by means of a compressed air valve which is actuated manually or via an external control connection.

In one preferred exemplary embodiment, the paint spray gun is provided with a compressed air connection, from which a compressed air channel system leads to the material application nozzle. It is consequently, in particular, a paint spray gun which atomizes the coating material in a compressed-air-assisted manner. It is preferably a HVLP paint spray gun or a compliant paint spray gun or a paint spray gun which may be in the form of a HVLP or compliant paint spray gun depending on the choice of the nozzle head.

One variant in which the compressed air connection is arranged on the non-material-conveying part has proved itself. The compressed air is preferably guided, via the non-material-conveying part, to the material-conveying part and from there to the nozzle head, where the compressed air is used to atomize the coating material (atomization compressed air) and/or to form the spray jet (for example horn compressed air).

According to one particularly preferred exemplary embodiment, in addition to the transmitting and/or receiving device, the paint spray gun comprises one or more electronic components which are directly or indirectly connected to the transmitting and/or receiving unit. Examples which can be mentioned are one or more sensor units, one or more actuator units, one or more display units, a data storage unit, a data processing unit and/or an energy storage unit.

One variant is distinguished by simple incorporation in a modular standardized network, in which variant one or more sensor units of the paint spray gun are provided in a semiconductor design, use the standard protocol MQTT to transmit sensor values and have the hardware interface $I^2C$.

By way of example, one or more sensor units for measuring the material, atomization or nozzle internal pressure, the air pressure in the horn compressed air region or the transport air pressure are provided. Furthermore, a sensor unit for measuring the material or compressed air flow rate may be advantageous. Furthermore, a paint spray gun may preferably be provided with a sensor unit which detects actuation of an actuation lever (discharge) or a sensor unit for determining the gun position and/or movement.

However, in addition to sensor units for determining operating parameters of the paint spray gun, one or more sensor units for determining environmental parameters, for example the air pressure, the humidity, the air speed and/or the ambient temperature, may also be advantageously provided on the paint spray gun.

In particular, the sensor units for determining environmental parameters may also be provided separately from the paint spray gun in connection with another module of a network, in which the paint spray gun is incorporated.

One or more controllable actuator units are preferably provided on the paint spray gun. In the case of one particularly preferred exemplary embodiment, the paint spray gun has one or more actuator units in the form of a pressure control valve which are directly or indirectly connected to the transmitting and/or receiving device.

In one advantageous variant of the invention, a sensor unit for measuring the atomization air pressure and an actuator unit in the form of a pressure control valve for adjusting the atomization pressure are provided, for example, on the paint spray gun. Overall, a control loop for the pressure of the atomization compressed air is formed in the paint spray gun and can be used to measure the pressure directly at the paint spray gun and to control it to a desired target value. This is particularly advantageous in the case of paint spray guns for liquid paints in particular, since the paint application quality decisively depends on the atomization and therefore on the atomization pressure directly applied to the nozzle head. Alternatively or additionally, a control loop may also be provided for another setting parameter, for example the pressure of the horn compressed air. If appropriate, three or more control loops may also be provided for further setting parameters.

In the case of one particularly preferred exemplary embodiment, the paint spray gun has a display unit which is directly or indirectly connected to the transmitting and/or receiving device and displays the following information, for example: measured sensor values from sensor units of the paint spray gun or from other modules; target values for setting and/or operating parameters; optical warning or alarm signals, data relating to the coating material or the current coating task etc.

Alternatively or additionally, the paint spray gun may be provided with a haptic or acoustic warning or alarm function (for example vibration alarm).

The stated information and further information may also be displayed, for example, on a display unit in connection with another module of a network, in which the paint spray gun is incorporated.

The paint spray gun preferably also has a data processing unit (CPU) for controlling the transmitting and/or receiving device, the sensor and/or actuator units and for processing data from these units.

In one particularly preferred exemplary embodiment, an energy storage unit is provided and can be charged in a contactless manner, in particular.

The paint spray gun may preferably be additionally provided with a USB interface which is directly or indirectly connected to one or more of the electronic components or the transmitting and/or receiving device.

The electronic components are preferably likewise at a distance from the material-conveying part and associated with the non-material-conveying part.

In the case of one advantageous variant, the transmitting and/or receiving unit and one or more of the electronic components are in the form of an electronic module. In particular, the electronic module comprises a circuit board on which some of the components are arranged. The electronic components are preferably in the form of SMD components which are arranged on an SMD circuit board, thus resulting in a space-saving and cost-effective design of the electronic module.

In one particularly preferred exemplary embodiment, the transmitting and/or receiving device is releasably connected to the paint spray gun. The transmitting and/or receiving device can be removed, for example, before cleaning the paint spray gun and can then be connected to the cleaned paint spray gun again. This prevents damage during the cleaning operation. The cleaning of the remaining part, in particular the material-conveying part, is simplified since no consideration must be given to the transmitting and/or receiving device.

The transmitting and/or receiving device is preferably part of a removable electronic module having one or more further electronic components, which electronic module is integrated in the handle of the paint spray gun, for example. The transmitting and/or receiving device or the electronic module may also be integrated in a handle of the paint spray gun, which handle can be removed overall as a unit from the remaining paint spray gun, in particular the material-conveying part of the paint spray gun.

One variant of the paint spray gun is distinguished by a particularly advantageous air pressure measurement, in which variant at least one pressure measuring channel is provided and is routed from a compressed air chamber in the material-conveying part of the paint spray gun to an electronic component in the form of a pressure sensor, wherein the pressure sensor is at a distance from the material-conveying part and is associated with the non-material-conveying part. In particular, the pressure sensor belongs to an electronic module having the features explained above.

The pressure measuring channel is preferably formed, at least in sections, by a bore or a channel in the material-conveying part and/or in the non-material-conveying part of the paint spray gun. Alternatively or additionally, a pressure measuring channel may also be formed by a hose or the like.

In one particularly preferred exemplary embodiment, the paint spray gun has a round/broad jet setting device which is used to variably divide supplied compressed air into atomization compressed air and horn compressed air which are each supplied to the nozzle head. At least one atomization compressed air region and one horn compressed air region result downstream of the round/broad jet setting device.

The compressed air chamber, from which a pressure measuring channel is routed to a pressure sensor, is preferably formed by the atomization compressed air region or is arranged in the atomization compressed air region. Alternatively or additionally, a (further) compressed air chamber, from which a (further) pressure measuring channel is routed to a (further) pressure sensor, is formed by the horn compressed air region.

In one advantageous further development, one or more pressure chambers, from which a pressure measuring channel is routed to a pressure sensor, directly adjoining the exchangeable nozzle head. This compressed air chamber or these compressed air chambers is/are preferably arranged in the atomization compressed air region and/or horn air region.

Increased functional reliability is also achieved by means of a paint spray gun in which a transmitting and/or receiving device is designed to wirelessly transmit signals according to a first radio standard, for example Bluetooth, and is additionally designed to wirelessly transmit signals according to a second radio standard, for example LoRawan, wherein the second radio standard is suitable for wirelessly transmitting signals over a wider range than the first radio standard, and in particular also through the walls of paint spray booths. In this sense, the second radio standard is, for example, a radio standard which is distinguished by a wider free field range than the first radio standard. In particular, the second radio standard is distinguished by a wider range in the paint spray environment. It has a greater penetration of paint spray booth walls and similar obstacles.

In particular, Bluetooth LE 5.0 has proved itself in practice as the first radio standard and LoRawan at 433/866 MHz or 910 MHz has proved itself as the second radio standard. Further possible radio standards are, for example, WLAN, DECT ULE, EnOcean, ZigBee or Z-wave.

A reliable transmitting or receiving power is ensured by virtue of the transmitting and/or receiving device respectively having an antenna for transmitting signals for each of the different radio standards in one preferred exemplary embodiment.

The invention also relates to a material application system having a paint spray gun with the features explained above and below, wherein the material application system has at least one module which is separate from the paint spray gun and comprises a transmitting and/or receiving device for wirelessly transmitting signals from and to the transmitting and/or receiving device of the paint spray gun.

The material application system preferably forms a modular ATEX-approved network for capturing and processing relevant parameters at all conceivable points of the paint spraying process. The aim of processing the information from a plurality of modules networked in this manner in a central unit is also expanded planning possibilities (preventative maintenance, capture of operating and consumption data, capture of the need to exchange worn parts etc.). Incorporating paint spray guns and further products involved in the paint spraying process makes it possible to determine, transmit and evaluate a multiplicity of different items of information and data (for example filter saturation state, pressure values from filters, gun setting, material pressure, throughputs of air or/and material, temperatures of materials and the environment, humidity, operating times of guns, consumption values for material and/or compressed air, state of charge, time, summation of the operating time, etc.).

A wirelessly networked material application system advantageously matched to the occurrences of paint spraying processes results by virtue of the material application system having at least two modules which are separate from the paint spray gun and each comprise a transmitting and/or receiving device for wirelessly transmitting signals from and to the transmitting and/or receiving device of the paint spray gun.

In this case, one of the modules is a near field module, in particular a portable near field module, for use in a paint spray booth and for transmitting signals from and to the transmitting and/or receiving device according to a first radio standard.

Alternatively or additionally, another of the modules is in the form of a region module, in particular a stationary region module, for use outside a paint spray booth for transmitting signals from and to the transmitting and/or receiving device according to a second radio standard.

It goes without saying that the second radio standard is suitable for transmitting signals over a wider range than the first radio standard; in particular, the second radio standard is suitable for transmitting signals from inside a paint spray booth, through a booth wall, to the outside or vice versa.

Preferred examples of the configuration of the near field module which can be mentioned are a wristwatch, a wall clock, a tablet, data glasses, a smartphone, a data logger or the like. A near field module could possibly also be in the form of an ATEX-compliant notebook. However, standard notebooks are not ATEX-compliant.

The design of the near field module as a wristwatch is particularly preferred. For example, the wristwatch can be used to display pressure values. The watch preferably makes it possible to input target values for setting parameters of the paint spray gun. The watch may provide acoustic, optical or haptic (vibration) alarm or warning functions.

The region module is characterized, in particular, in that it is suitable for incorporation in a central network (possibly with an Internet interface). In particular, it is suitable for connection to a data processing system, for example a PC. In this manner, all functions of the PC can also be used for the network of the material application system, such as storage, processing, input or forwarding of data, in particular also to connected networks (wirelessly, by cable, by USB, by mail, by SMS, etc.). For example, the climate data currently available at the place of use can also be obtained via the Internet and can be taken into account.

The transmitting and/or receiving device of the region module may preferably additionally be designed to transmit signals according to the first radio standard. This makes it possible for the region module to communicate with further modules of the network which are in the vicinity of the region module. In particular, the region module may communicate with one or more near field modules if they come into the vicinity of the region module, for example from the paint spray booth.

The invention also relates to a method for operating a material application system, in which information relating to proposals for setting parameters or other operating parameters of the paint spray gun for a coating task and/or measured values of setting parameters or other operating parameters of a coating task carried out with the paint spray gun is transmitted by transmitting signals between the transmitting and/or receiving device of the paint spray gun and the transmitting and/or receiving device of the separate module or the transmitting and/or receiving devices of the separate modules. A proposal for a nozzle type to be used (HVLP, compliant etc.) or the nozzle size can also be mentioned as information to be transmitted, for example.

In the case of one particularly preferred example, proposals for setting parameters or other operating parameters of the coating task with the paint spray gun are automatically determined on the basis of an identification of the coating material, for example by means of a barcode reader, for a pending coating task with the paint spray gun and preferably on the basis of further operating and/or environmental parameters. The proposals are transmitted from the separate module or from the separate modules to the paint spray gun and/or vice versa by means of the transmitting and/or receiving devices.

BRIEF DESCRIPTION OF THE DRAWINGS

The invention is explained below on the basis of exemplary embodiments. In the figures.

DETAILED DESCRIPTION

Figure 1:
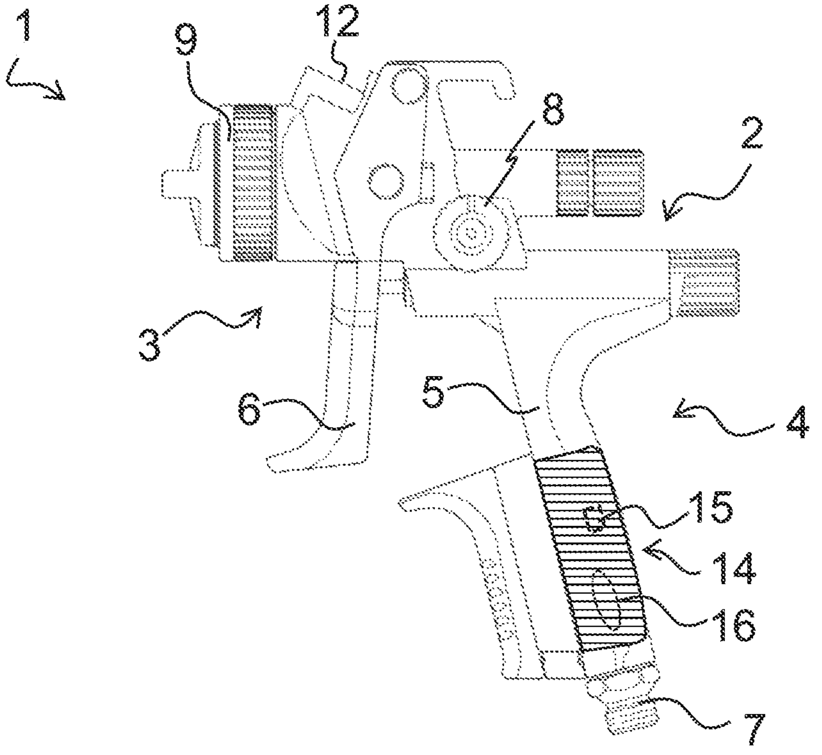
FIG. 1 shows a paint spray gun having a removable electronic module which comprises a transmitting and/or receiving unit.

FIG. 1 shows a handheld paint spray gun 1 for the compressed-air-assisted atomization and application of a coating material. The paint spray gun 1 is in the form of a HVLP paint spray gun. Alternatively, it could also be in the form of a compliant paint spray gun.

The paint spray gun 1 comprises a base body 2 having a material-conveying part 3 and a non-material-conveying part 4 which is in the form of a handling part with a handle 5 for a painter. An actuation lever 6 is pivotably fitted to the material-conveying part 3. A compressed air connection 7, for example for a compressed air supply hose which is not shown, is provided at the lower end of the handle 5. Starting from the compressed air connection 7, supplied compressed air is guided, by means of a compressed air line system inside the paint spray gun, to a nozzle head 9 of the paint spray gun 1 via a round/broad jet setting device 8. The round/broad jet setting device 8 is used to set the division of the supplied compressed air into atomization compressed air and horn compressed air which are separately supplied to the nozzle head 9. At least one atomization compressed air region 10 and one horn compressed air region 11 (FIG. 2) are therefore formed in the material-conveying part 3 of the paint spray gun 1 downstream of the round/broad jet setting device 8.

The material-conveying part 3 has a material feed 12 in the form of a flow cup connection. The material-conveying part 3 of the paint spray gun 1 is also provided with the interchangeable nozzle head 9. Under the influence of gravity and on account of a suction effect of the atomization air emerging at the nozzle head 9, the coating material, for example paint, is conveyed, via a material channel set-up 13 (FIG. 2), from a flow cup connected to the flow cup connection to the nozzle head 9.

The paint spray gun 1 also has an electronic module 14 integrated in the handle 5. The electronic module 14 is removable, with the result that it can be temporarily removed, for example for cleaning the paint spray gun 1 with solvent. In an alternative configuration, the entire handle 5 can also be removable as a unit from the upper part of the paint spray gun 1 which comprises the material-conveying part 3. In both cases, the electronic module 14 is at a distance from the material-conveying part 3 of the paint spray gun 1 and is associated with the non-material-conveying part 4.

The electronic module 14 comprises, inter alia, a transmitting and/or receiving device 15 for wirelessly transmitting signals, which device is indicated in FIG. 1. The transmitting and/or receiving device 15 is designed to wirelessly transmit signals according to two different radio standards. Bluetooth LE 5.0 is used as the first radio standard. LoRawan at 433/866 MHz or 910 MHz is used as the second radio standard. The second radio standard is suitable for wirelessly transmitting signals over a wider range than the first radio standard and through obstacles which may be present (for example the wall of a paint spray booth). The transmitting and/or receiving device 15 is respectively provided with an antenna accommodated in the paint spray gun 1 for each of the two radio standards.

In addition to the transmitting and/or receiving device 15, the electronic module 14 has a plurality of electronic components which are directly or indirectly connected to the transmitting and/or receiving unit 15. The electronic module 14 therefore comprises two pressure sensor units, a data storage unit, a data processing unit (CPU) and an energy storage unit in the form of a contactlessly rechargeable battery. The charging coil 16 of the battery is indicated in FIG. 1.

The electronic module 14 comprises a circuit board to which, inter alia, the pressure sensor units in the form of SMD components, a data storage unit and the data processing unit (CPU) are applied. The components, in particular the sensors, need not be directly arranged on the circuit board, but rather may also be separated from the circuit board and may be connected to the circuit board or to components on the circuit board or to other components or units separated from the circuit board in a wired or wireless manner.

As already explained above, in another exemplary embodiment, other or additional electronic components, such as an actuator unit and a display unit etc., may be provided.

The pressure sensor units or pressure sensors are used to measure the air pressure in two different pressure chambers 17, 18 in the material-conveying part 3 of the paint spray gun 1. The pressure chambers 17, 18, from each of which a pressure measuring channel 19, 20 is routed to one of the pressure sensors, are shown in FIG. 2 in which the front section of the paint spray gun 1 is illustrated in section.

The interchangeable nozzle head 9 is screwed onto a front section of the base body 2 of the paint spray gun 1. FIG. 2 shows a section of the material channel set-up 13 which opens into the nozzle head 9. The nozzle head 9 comprises a screwed-in material nozzle 21 surrounded by an air nozzle arrangement 22 which forms an outlet gap 23 for the atomization air and is provided with two opposite horns 24 with horn air nozzles 25. The air nozzle arrangement 22 is interchangeably fastened to the base body 2 of the paint spray gun 1 by means of an air nozzle ring 26. A baffle disk 27 is permanently connected to the material nozzle 21 and is concomitantly removed when disassembling the nozzle head 9.

Figure 2:
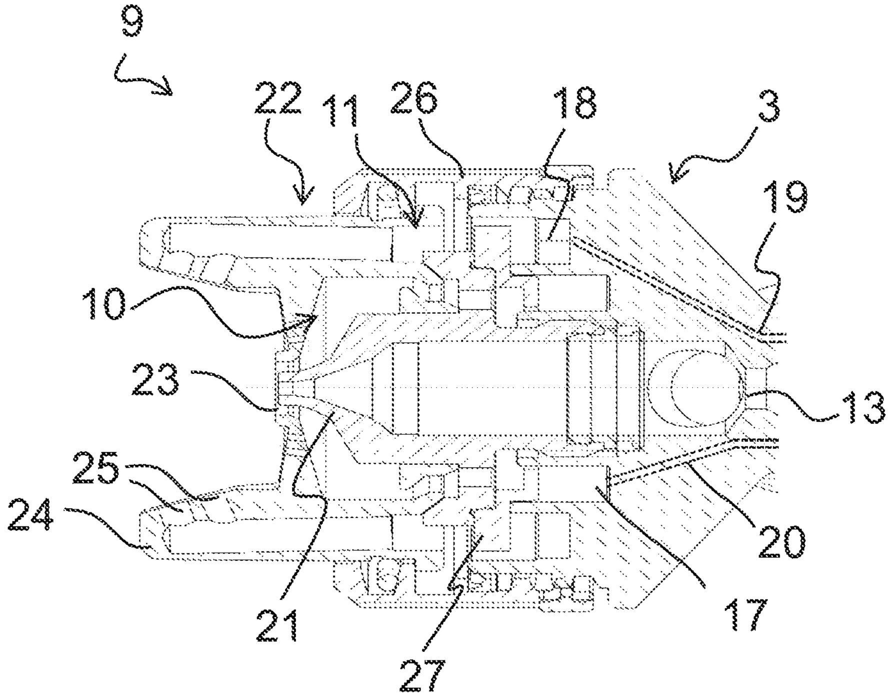
FIG. 2 shows a sectional illustration of the front section of the paint spray gun according to FIG. 1.

It is clear from FIG. 2 that the first compressed air chamber 17 is formed by the atomization compressed air region 10 or is arranged in the atomization compressed air region 10. The second compressed air chamber 18 is formed by the horn compressed air region 11 or is arranged in the horn compressed air region 11. Both compressed air chambers 17, 18 directly adjoin the nozzle head 9, that is to say part of the wall of the pressure chambers 17, 18 is formed by the nozzle head 9.

The pressure measuring channels 19, 20 indicated in FIG. 2 are formed in the material-conveying part 3 and in the non-material-conveying part 4 of the paint spray gun 1 as a bore and open in the electronic module 14.

There is a precise pressure measurement of the atomization compressed air and of the horn compressed area in the immediate vicinity of the atomization process. However, the pressure sensors are accommodated at a distance from the material-conveying part 3 of the paint spray gun 1 and therefore in a well-protected manner in the electronic module 14 which is arranged on the handle 5. The measured values from the pressure sensors can be stored, for example, by the data storage unit, can be processed by the data processing unit and can be transmitted to another module of the material application system 28 by means of the transmitting and/or receiving device 15.

Figure 3:
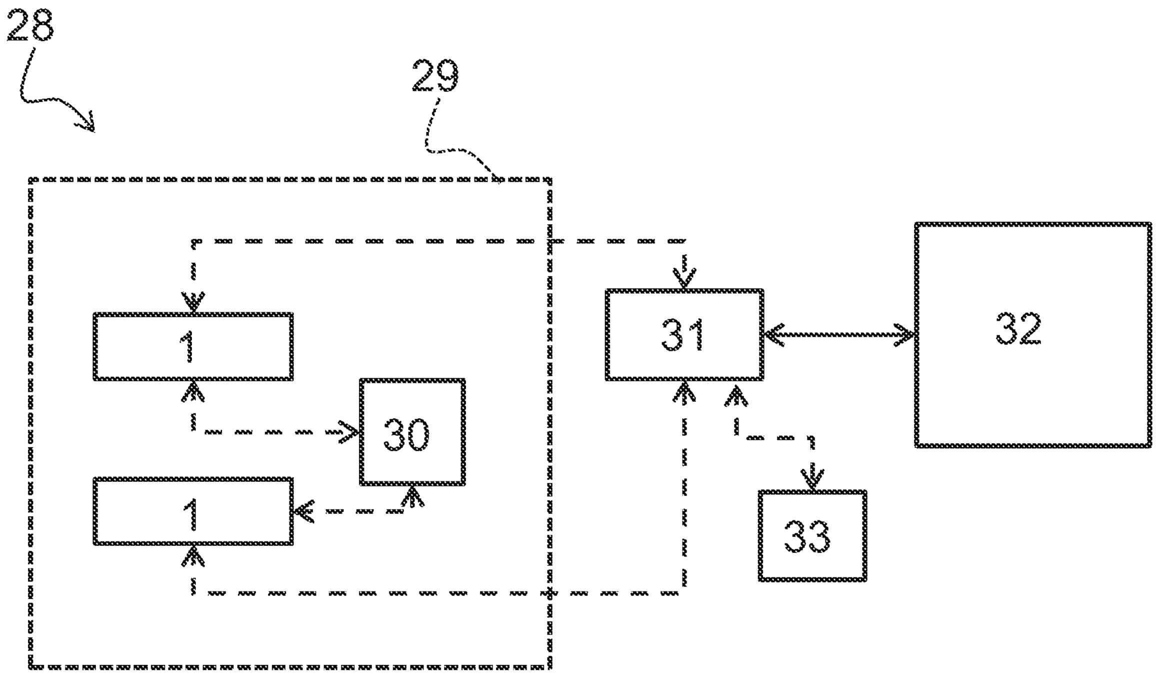
FIG. 3 shows the schematic structure of a wirelessly networked material application system having two paint spray guns according to FIG. 1.

An exemplary structure of the material application system 28 is explained on the basis of FIG. 3.

The material application system 28 has, for example, two paint spray guns 1 according to FIG. 1 which are each provided with an electronic module 14. A portable near field module 30 is also provided inside a paint spray booth 29 and is in the form of a wristwatch. The wristwatch can be worn by a painter working with the two paint spray guns 1. The wristwatch is suitable for bidirectionally transmitting signals with the paint spray guns 1 with the aid of the Bluetooth LE 5.0 radio standard. It has a display which can be used to display different items of data and information. For example, the pressure values measured by the pressure sensors in the paint spray guns 1 can be displayed. The watch also makes it possible to input target values, for example for the measured pressures, and provides an acoustic, optical or haptic (vibration) alarm or warning function if the measured actual value differs (too greatly) from a predefined target value.

It goes without saying that further paint spray guns 1 or further near field modules 30, which may have a different design to the wristwatch, can be incorporated in the modular and standardized network of the material application system 28.

A stationary region module 31 (gateway) is arranged outside the paint spray booth and is suitable for bidirectionally transmitting signals with the two paint spray guns 1 according to the LoRawan radio standard. The region module 31 has Internet capability, for example, has a powerful CPU and a display. It is connected to a PC 32 on which it is possible to install different software applications which evaluate data transmitted by the paint spray guns 1 and generate data for transmission to the paint spray guns 1.

The region module 31 may also be connected to a mobile telephone 33, a tablet etc., on which it is likewise possible to install different software applications which evaluate data transmitted by the paint spray guns 1 and generate data for transmission to the paint spray guns 1. The bidirectional signal transmission between the mobile telephone 33 etc. and the region module 31 is carried out according to the first radio standard (Bluetooth). If the near field module 30 comes into the vicinity of the region module 31 from the paint spray booth 29, it can also receive data/information from the region module 31 or can transmit data/information to the latter according to the first radio standard (Bluetooth).

During operation of the material application system 28, information relating to proposals for setting parameters or other operating parameters of the paint spray gun 1 for a coating task and/or measured values of setting parameters or other operating parameters of a coating task carried out with the paint spray gun 1 is transmitted between the transmitting and/or receiving device 15 of the paint spray guns 1, the near field module and the region module.

In particular, a paint for a pending car paint repair job, for example, can be first of all identified by means of a barcode reader which is connected to the network. A software application installed on the PC 32 reads the information from a data sheet for the paint which is stored in a database. On the basis of the information in the data sheet and taking into account currently measured environmental parameters in the paint spray booth 29, for example, proposals for the nozzle selection and (target values) for the pressure of the atomization compressed air or the horn compressed air are determined. The proposals (target values) are transmitted to the paint spray gun(s) 1 and are possibly transmitted from there on to the wristband watch for display.

The described paint spray gun, the described material application system and the described method for operating a material application system can be used, in particular, in the industrial sector, that is to say it can be integrated in non-handheld automatic or robot paint spray guns or can be used therefor. It is also possible to incorporate components in already existing networks (Industry 4.0, digitization), for example in in-house networks, in order to make it possible to interchange data between different departments or different hierarchies. Alternatively or additionally, it may be possible to incorporate components in a network with a connection to a device outside one's own company in order to make it possible to interchange data with other companies, authorities or other devices or persons. These may be, for example, suppliers, customers, partners, supervisory bodies. In particular, data from a paint spraying company can be sent to a supplier of paint, paint spray tools, in particular paint spray guns, or spare parts, in particular nozzle sets for paint spray guns or cartridges for filters, in order to enable preventative maintenance or the delivery of a spare part on the basis of the captured operating data. However, provision may also be made for data to be transmitted to a customer, with the result that the latter can track the status of his paint spray order. The components can be incorporated, for example, via LAN, WLAN or other wired or wireless transmission technologies.

The invention claimed is:

1. A paint spray gun for atomization and application of a paint, the paint spray gun comprising:

a material-conveying portion into which a material channel system opens, the material-conveying portion including:

a material feed configured for receiving the paint;

a nozzle head; and the material channel system which leads to the nozzle, the material channel system being configured for conveying the paint from the material feed to the nozzle head;

a non-material-conveying portion of the paint spray gun;

a transmitting and receiving device configured for bidirectional wireless data transmission; and a compressed air connection and a compressed air line system, the compressed air line system being configured for guiding compressed air from the compressed air connection to the nozzle head, wherein the transmitting and receiving device is at a distance from the material-conveying portion and is associated with the non-material-conveying portion, wherein the transmitting and receiving device is configured for wireless data transmission according to a first radio standard, and is additionally configured for wireless data transmission according to a second radio standard, wherein the second radio standard is suitable for wirelessly transmitting data over a wider range than the first radio standard, wherein the paint spray gun further comprises a first pressure measuring channel that is routed from a first compressed air chamber in the material-conveying portion of the paint spray gun to a first pressure sensor, the first pressure measuring channel being different than the compressed air line system that guides compressed air from the compressed air connection to the nozzle head, wherein the first compressed air chamber is formed by or arranged in an atomization compressed air region in the material-conveying portion of the paint spray gun, and the first pressure sensor is configured to measure air pressure in the atomization compressed air region, and wherein the first pressure sensor is at a distance from the material-conveying portion and is associated with the non-material-conveying portion.

2. The paint spray gun as claimed in claim 1, wherein the paint spray gun is in the form of a handheld paint spray gun.

3. The paint spray gun as claimed in claim 1, wherein the paint spray gun includes an electronic module that includes the transmitting and receiving device and one or more of the following electronic components which are directly or indirectly connected to the transmitting and receiving device: one or more actuator units, a display unit, or a CPU, and wherein the electronic module is at a distance from the material-conveying portion and is associated with the non-material-conveying portion, and is configured to be removable as a unit from the paint spray gun so as to be capable of being removed for cleaning the paint spray gun.

4. A paint application system comprising:

the paint spray gun as claimed in claim 1; and at least one module which is separate from the paint spray gun and comprises a transmitting and receiving device configured for bidirectional wireless data transmission with the transmitting and receiving device of the paint spray gun.

5. The paint application system as claimed in claim 4, wherein the paint application system comprises at least two modules which are separate from the paint spray gun and each comprise a transmitting and receiving device configured for bidirectional wireless data transmission with the transmitting and receiving device of the paint spray gun, wherein one of the modules is in the form of a near field module for use in a paint spray booth and is configured for wireless data transmission with the transmitting and receiving device of the paint spray gun according to the first radio standard, and another of the modules is in the form of a gateway for use outside the paint spray booth and is configured for wireless data transmission with the transmitting and receiving device of the paint spray gun according to the second radio standard, and wherein the second radio standard is suitable for wirelessly transmitting data from inside the paint spray booth, through a wall of the paint spray booth, to the outside, and vice versa.

6. The paint application system as claimed in claim 4, wherein the transmitting and receiving device of the paint spray gun is configured for wirelessly transmitting data relating to proposals for setting parameters or other operating parameters of the paint spray gun for a coating task and/or measured values of setting parameters or other operating parameters of the coating task to and from the transmitting and receiving device of the at least one module.

7. The paint application system as claimed in claim 6, wherein the transmitting and receiving device of the at least one module is configured for determining the proposals for setting parameters or other operating parameters of the coating task on the basis of an identification of the paint for the coating task and on the basis of further operating and/or environmental parameters.

8. The paint spray gun as claimed in claim 1, wherein the compressed air connection is arranged on the non-material-conveying portion of the paint spray gun.

9. The paint spray gun as claimed in claim 1, wherein the first pressure measuring channel is formed, at least in part, by a bore that passes through both the material-conveying portion and the non-material-conveying portion of the paint spray gun, the bore not being part of the compressed air line system.

10. The paint spray gun as claimed in claim 1, wherein the first radio standard is a packet-based personal area network communication protocol that uses frequency hopping in the 2.4 GHz unlicensed radio band to interconnect devices, and the second radio standard is a wireless communication protocol, and wherein the paint spray gun includes an antenna for wirelessly transmitting data according to each of the two radio standards.

11. The paint application system as claimed in claim 5, wherein the near field module is a portable near field module and the gateway is a stationary gateway.

12. The paint application system as claimed in claim 7, wherein the proposals for setting parameters or other operating parameters of the coating task are automatically determined, and wherein the identification of the paint is determined via a barcode reader.

13. The paint spray gun as claimed in claim 1, further comprising:

a handle for a painter, wherein the transmitting and receiving device is integrated in the handle of the paint spray gun, and wherein the handle, into which the transmitting and receiving device is integrated, is configured to be removable as a unit from the paint spray gun so as to be capable of being removed for cleaning the paint spray gun.

14. The paint spray gun as claimed in claim 1, further comprising:

an electronic module that includes the first pressure sensor and the transmitting and receiving device, wherein the electronic module, which includes the first pressure sensor and the transmitting and receiving device, is configured to be removable as a unit from the paint spray gun so as to be capable of being removed for cleaning the paint spray gun.

15. The paint spray gun as claimed in claim 1, further comprising:

a second pressure measuring channel that is routed from a second compressed air chamber in the material-conveying portion of the paint spray gun to a second pressure sensor, the second pressure measuring channel being different than the compressed air line system that guides compressed air from the compressed air connection to the nozzle head, wherein the second compressed air chamber is formed by or arranged in a horn compressed air region in the material-conveying portion of the paint spray gun, and the second pressure sensor is configured to measure air pressure in the horn compressed air region, and wherein the second pressure sensor is at a distance from the material-conveying portion and is associated with the non-material-conveying portion.

* * * * *